US008730284B2

(12) United States Patent
Ono et al.

(10) Patent No.: US 8,730,284 B2

(45) Date of Patent: May 20, 2014

(54) PRINTING APPARATUS AND CONTROL METHOD THEREOF

(75) Inventors: Yasuhiro Ono, Tokyo (JP); Shunpei Kimura, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 13/217,884

(22) Filed: Aug. 25, 2011

(65) Prior Publication Data

US 2012/0056963 A1 Mar. 8, 2012

(30) Foreign Application Priority Data

Sep. 2, 2010 (JP) ................................ 2010-197139
Aug. 8, 2011 (JP) ................................ 2011-173280

(51) Int. Cl.
*B41J 2/325* (2006.01)
*G06F 3/12* (2006.01)

(52) U.S. Cl.
USPC .......................................................... 347/171

(58) Field of Classification Search
USPC .......................... 347/171, 172, 174, 176, 211
See application file for complete search history.

(56) References Cited

U.S. PATENT DOCUMENTS

2011/0010969 A1* 1/2011 Murray et al. .................. 40/122

FOREIGN PATENT DOCUMENTS

| | | |
|---|---|---|
| JP | 08-112953 | 5/1996 |
| JP | 2006-163693 | 6/2006 |
| JP | 2007-021748 | 2/2007 |

* cited by examiner

*Primary Examiner* — Huan Tran

(74) *Attorney, Agent, or Firm* — Cowan, Liebowitz & Latman, P.C.

(57) ABSTRACT

A printing apparatus includes an ink ribbon on which a plurality of color inks are arranged frame-sequentially, a printing unit configured to be able to print by a predetermined length by transferring the plurality of color inks onto roll paper by one cycle of the ink ribbon, and a print control unit configured to control the printing apparatus to successively print two calendar sheets in case that the printing apparatus is instructed to print a calendar sheet having a length larger than the predetermined length. The calendar sheet includes an image area corresponding to the predetermined length and a date area having a length not larger than substantially 0.5 times of the predetermined length. The print control unit controls the printing apparatus to rotate, through 180°, one of the two calendar sheets to be successively printed, and print.

20 Claims, 20 Drawing Sheets

PRINTING APPARATUS AND CONTROL METHOD THEREOF

BACKGROUND OF THE INVENTION

1. Field of the Invention

The present invention relates to a printing apparatus and control method thereof and, more particularly, to control processing when successively printing a plurality of calendar sheets with images on roll paper.

2. Description of the Related Art

A dye sublimation printer using roll paper can print a plurality of images successively at a paper size equal to or larger than the ribbon set unit by changing the paper cutting position. In general, yellow (Y), magenta (M), and cyan (C) sublimation dye layers and an overcoat (OC) layer for protecting an image forming layer are repetitively arranged on a base frame-sequentially in the conveyance direction on an ink ribbon used in a thermal transfer color printer. To form one image, Y, M, C, and OC, which form one cycle, are thermally transferred onto paper sequentially. In this specification, a unit corresponding to the length of an ink ribbon used for printing of one cycle will be called a "ribbon set unit".

In this printing method, the printer driver can rasterize data while automatically determining the data rotation angle in synchronization with functions such as banner printing, rotation, and mirror image. In some cases, the printing order can be reversed (see, for example, Japanese Patent Laid-Open No. 2006-163693).

A case where two monthly calendar sheets with images such as pictures are printed successively will be examined. FIGS. 2A and 2B exemplify printing results by a conventional method. FIG. 2A shows a printing result when a calendar sheet of the first month is printed with a 1.5-ribbon set unit of the ink ribbon and calendar sheets of two months are printed successively. More specifically, as shown in FIG. 2A, an image area such as a picture is printed in the area of a first ribbon set 201, and a date area is printed in a left half area 203 of a second ribbon set 202 beside the image area. When thus-obtained data of two months are printed successively, the picture becomes unnatural at a boundary 204 between the second and third ribbon sets. This problem is specific to dye sublimation printers and arises because the temperature of the thermal head has not risen satisfactorily at the beginning of printing and ink does not sublimate sufficiently.

To solve the above problem, printing as shown in FIG. 2B can prevent generation of the boundary 204 of the ribbon set in the image area in the conventional method. More specifically, an image area 211 of the first calendar sheet is printed in the area of the first ribbon set. Then, the date area is printed in a left half area 212 of the second ribbon set, and the right half is printed as an unprinted area 213. The second calendar sheet is printed using the third and subsequent ribbon sets, similar to the first calendar sheet. However, this method wastes the ink ribbon and paper by the unprinted areas 213.

SUMMARY OF THE INVENTION

The present invention provides a printing apparatus and its control method for preventing an unnatural image generated from updating the printing cycle during image printing to change the ink ribbon for use, and preventing the wasting of ink ribbon and paper when successively printing calendar sheets with images.

According to one aspect of the present invention, a printing apparatus includes an ink ribbon on which a plurality of color inks are arranged frame-sequentially, a printing unit configured to be able to print by a predetermined length by transferring the plurality of color inks onto roll paper by one cycle of the ink ribbon, and a print control unit configured to control the printing apparatus to successively print two calendar sheets in case that the printing apparatus is instructed to print a calendar sheet having a length larger than the predetermined length, wherein the calendar sheet includes an image area corresponding to the predetermined length and a date area having a length not larger than substantially 0.5 times of the predetermined length, and the print control unit controls the printing apparatus to rotate, through 180°, one of the two calendar sheets to be successively printed, and print.

Further features of the present invention will become apparent from the following description of exemplary embodiments (with reference to the attached drawings).

DESCRIPTION OF THE EMBODIMENTS (First Embodiment)

Figure 3:
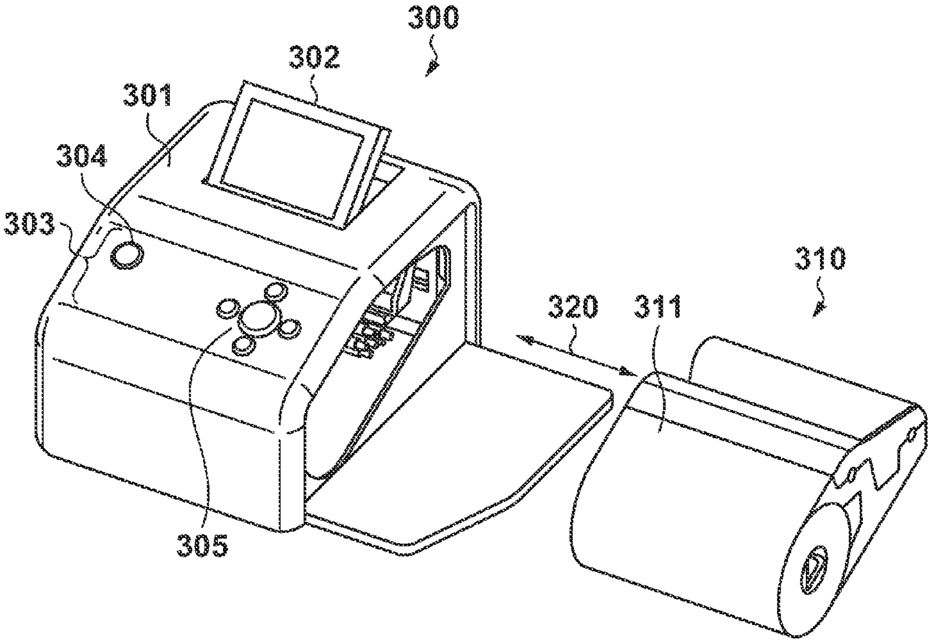
FIG. 3 is a perspective view showing the outer appearances of a printing apparatus and cartridge in the embodiment.

The arrangement of a printing apparatus in an embodiment will be explained with reference to FIGS. 3 and 4. FIG. 3 is a perspective view showing the outer appearances of a printing apparatus 300 and a cartridge 310 used in the printing apparatus 300 according to the embodiment. As shown in FIG. 3, the printing apparatus 300 includes a housing 301 which is opened/closed on its side surface and allows attaching/detaching the cartridge 310 in a direction indicated by an arrow 320. A display unit 302 and operation unit 303 are arranged on the top of the housing 301.

The display unit 302 is formed from a display screen such as an LCD. The display unit 302 displays image data to be printed, and a menu window and the like for inputting setting data necessary for printing. The operation unit 303 includes a power switch 304 configured to designate ON/OFF of the power supply of the printing apparatus, and a selection switch 305 configured to select various menus displayed on the display unit 302.

The cartridge 310 stores an ink-applied ink ribbon, and roll paper (band-like printing medium wound around a roller) serving as printing paper. Before the cartridge 310 is mounted in the printing apparatus 300, roll paper is enclosed in a housing 311 so that the user cannot directly touch the roll paper. In printing, the roll paper is pulled out from the cartridge 310. The thermal head of the printing apparatus transfers applied ink of the ink ribbon onto the roll paper, thereby printing.

For example, a plurality of color inks of yellow (Y), magenta (M), and cyan (C), and an overcoat (OC) layer for protecting an image forming layer are arranged on the base of the ink ribbon frame-sequentially in the conveyance direction. To form one image, Y, M, C, and OC of one cycle are thermally transferred onto paper sequentially. In this specification, a predetermined unit corresponding to the length of an ink ribbon used for printing of one cycle will be called a "ribbon set unit".

Figure 4:
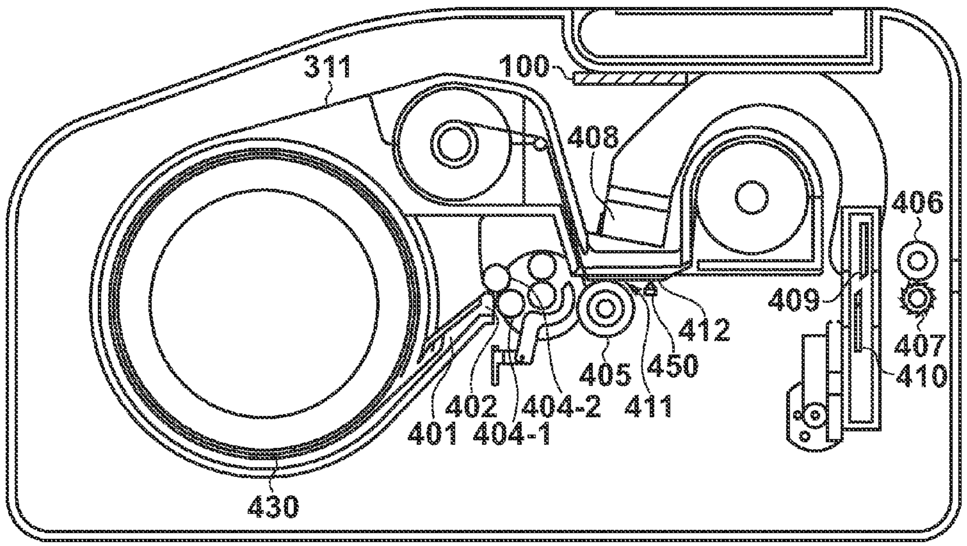
FIG. 4 is a side sectional view showing the printing apparatus in a state in which the cartridge is mounted.

FIG. 4 is a sectional view showing a state in which the cartridge 310 is mounted in the printing apparatus 300 when viewed from the side surface of the printing apparatus 300. The arrangement of respective units which operate when the printing apparatus 300 performs print processing will be explained briefly with reference to FIG. 4.

Referring to FIG. 4, roll paper 403 stored in the cartridge 310 passes through a conveyance path 401 when it is pulled out to a printing position 411 in printing. Reference numeral 402 denotes a cartridge outlet. A grip roller 404-1 and pinch roller 404-2 are positioned to face each other via the roll paper 403, and grip the roll paper 403 from its upper and lower surfaces. The grip roller 404-1 rotates clockwise to convey the roll paper 403 pulled out from the cartridge 310 toward the printing position 411. An optical sensor 450 detects the leading end of the roll paper 403. The optical sensor 450 also has a function of determining exhaustion of paper by detecting a hole formed near the trailing end of the roll paper 403.

A platen roller 405 keeps an ink ribbon 412 and the roll paper 403 overlapping between the platen roller 405 and a thermal head 408 at the printing position 411. A discharge roller 406 conveys the roll paper 403 in the discharge direction. Reference numeral 407 denotes a discharge ejection roller. The discharge roller 406 and discharge ejection roller 407 are positioned to face each other via the roll paper 403, and grip the roll paper 403 from its upper and lower surfaces.

A cutter blade 409 and cutter bed blade 410 form a cutter unit, and are positioned to face each other via the conveyance path of the roll paper 403. The cutter blade 409 and cutter bed blade 410 are ground together like scissors, cutting the roll paper 403. A print control unit 100 controls the above-described printing unit, and is formed from a logic board having a CPU, RAM, ROM, and the like.

The operation of the printing apparatus 300 will be explained in detail.

Figure 1A:
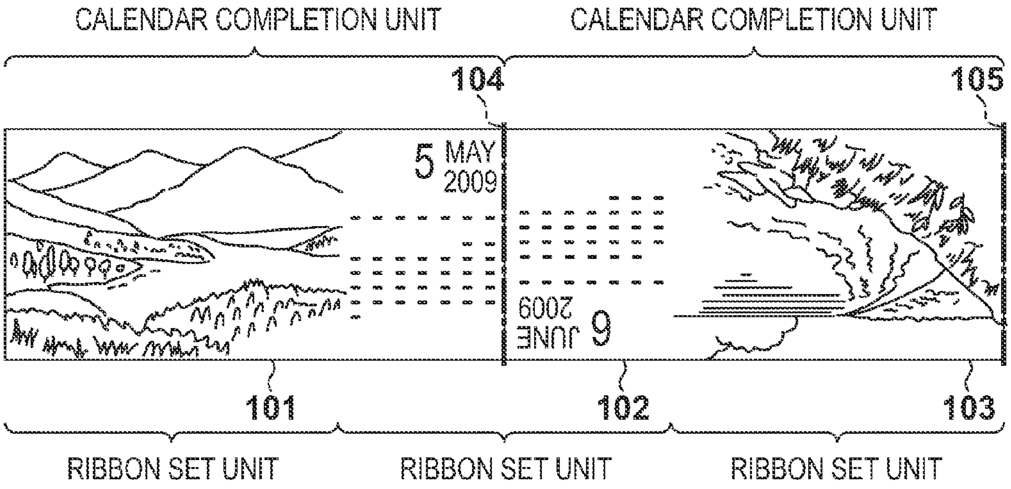
FIGS. 1A and 1B are views each exemplifying the result of successively printing two calendar sheets by print processing according to an embodiment.
Figure 2A:
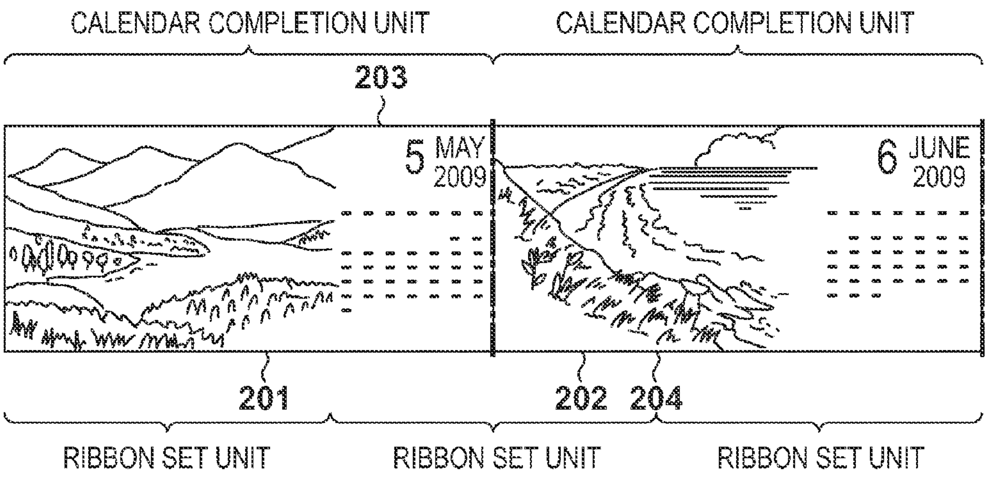
FIGS. 2A and 2B are views each exemplifying the result of successively printing two calendar sheets by conventional print processing.

A case in which the printing apparatus 300 successively prints two monthly calendar sheets with images will be examined. FIG. 1A exemplifies a printing result according to the first embodiment. Similar to FIG. 2A, FIG. 1A shows a printing result when a calendar sheet of the first month is printed with a 1.5-ribbon set unit of the ink ribbon 412 and calendar sheets of two months are printed successively. In other words, each of the first and second calendar sheets includes an image area about 1 times longer than a predetermined unit length corresponding to printing of one cycle and a date area having a length not larger than about 0.5 times of the predetermined unit length adjacent to the image area. That is, each calendar sheet has an about 1.5 times-long total length. The first and second calendar sheets are printed successively. In the embodiment, a calendar sheet of the second month is printed in an orientation rotated through 180° with respect to that of the first month, as shown in FIG. 1A.

Figure 5A:
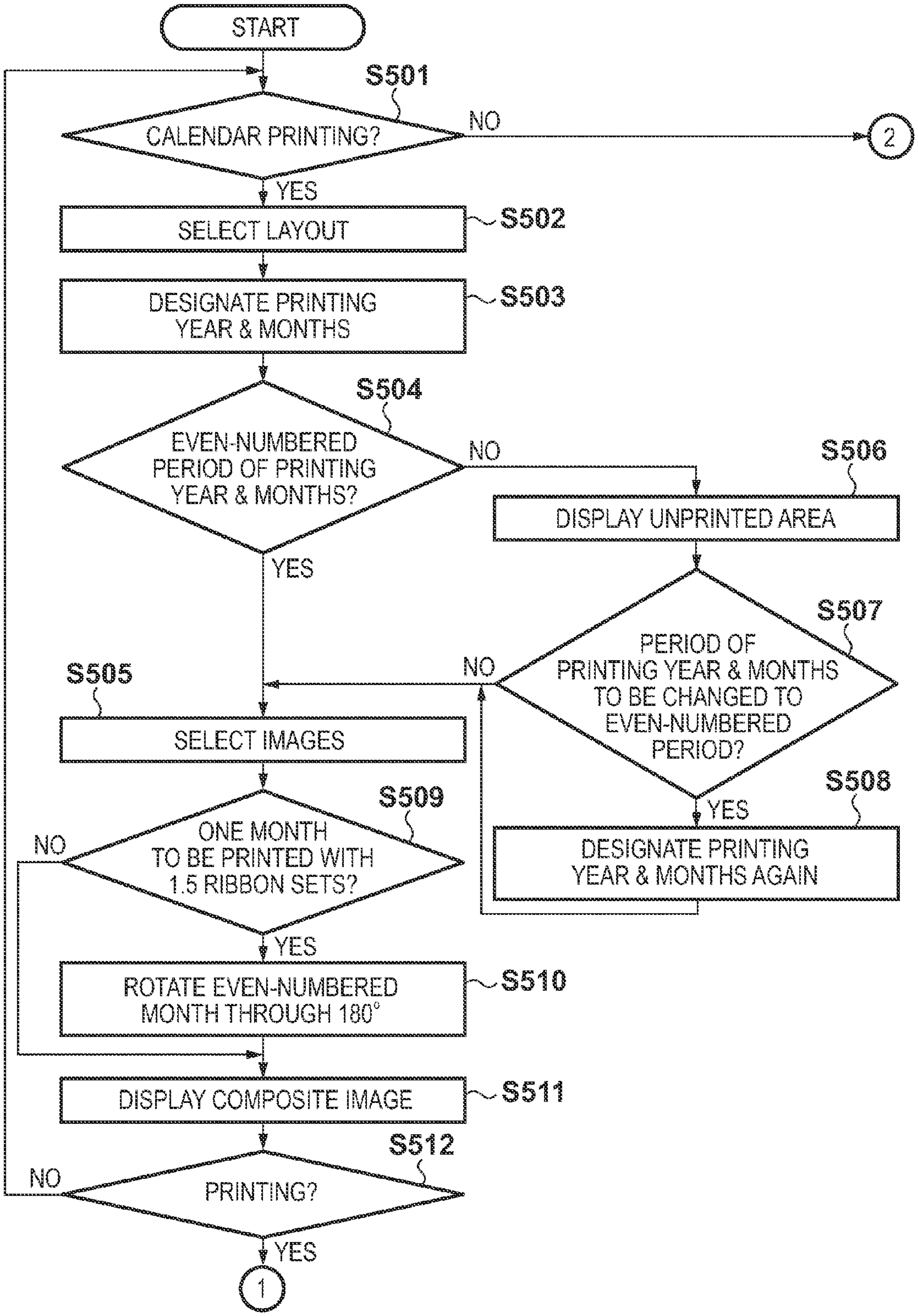
FIGS. 5A and 5B are flowcharts showing calendar printing in the first embodiment.
Figure 5B:
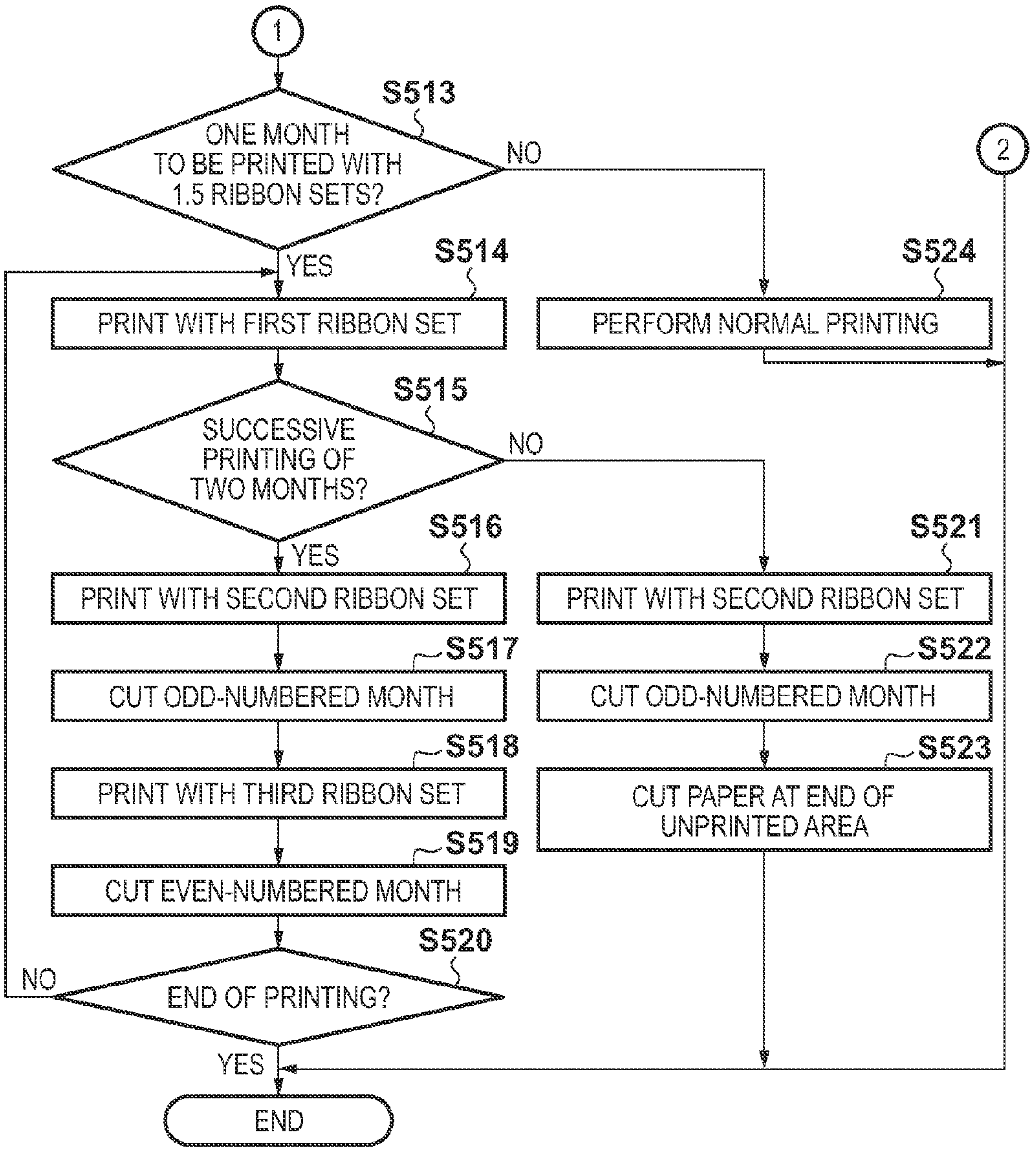

FIGS. 5A and 5B are flowcharts showing calendar printing in the first embodiment. First, the user selects calendar printing via the operation unit 303 (step S501). If the user does not select calendar printing, it is determined that he selects another printing method, and the sequence ends. If the user selects calendar printing, he selects a calendar layout (step S502). In the layout selection, the user selects a layout of his choice from several layouts displayed on the display unit 302. Based on the selected layout, it is determined which of 1.5 ribbon sets or 1 ribbon set is used to print a calendar sheet of one month.

After determining the layout, the user designates a year and months to be printed (step S503). After determining the period of the year and months to be printed, the printing apparatus 300 determines whether the period of the designated year and months to be printed is an even-numbered period of two or more months (step S504). If the period of the year and months to be printed is an even-numbered period of two or more months, the user selects images to be fitted in the picture areas of calendar sheets (step S505). If the period of the year and months to be printed is not an even-numbered period of two or more months, the display unit 302 notifies the user that an unprinted area will be generated (step S506). At this time, it is desirable to notify the user that no unprinted area will be generated if he designates an even-numbered period of two or more months. Upon receiving this notification, the user can select whether to change the period of the year and months to be printed to an even-numbered period of two or more months (step S507). When changing the period of the year and months to be printed to an even-numbered period of two or more months, the user designates again a year and months to be printed (step S508). After designating again the year and months to be printed, the user selects images to be fitted in the picture areas of calendar sheets (step S505). Even if the user does not change the period of the year and months to be printed to an even-numbered period of two or more months, the user selects images to be fitted in the picture areas of calendar sheets (step S505).

After determining the images to be fitted in the picture areas of calendar sheets, the printing apparatus 300 determines, from the calendar layout selected by the user, which of 1.5 ribbon sets or 1 ribbon set is used to print a calendar sheet of one month (step S509). When printing a calendar sheet of one month with 1.5 ribbon sets, the printing apparatus 300 creates calendar composite image data in which a calendar sheet of the first month (to be referred to as the first sheet) is set in a normal orientation and a calendar sheet of the second month (to be referred to as the second sheet) is rotated through 180° (step S510). The printing apparatus 300 displays the created calendar composite image on the display unit 302 (step S511), and the user can confirm it. When confirming the calendar composite image on the display unit 302, it is desirable to notify the user that the second calendar sheet will be printed out in an orientation rotated through 180° with respect to the first calendar sheet. When the first sheet becomes redundant in print processing, it is desirable to notify the user again that an unprinted area will be generated. When printing a calendar sheet of one month with 1 ribbon set, the printing apparatus 300 creates normal calendar composite image data without the above rotation operation, and displays it on the display unit 302.

Then, the printing apparatus 300 determines whether the user has input a print instruction via the operation unit 303 (step S512). If the user has input a print instruction, the printing apparatus 300 determines which of 1.5 ribbon sets or 1 ribbon set is used to print for the calendar layout selected by the user (step S513). If the user cancels print processing, the sequence returns to selection of calendar printing (step S501).

Figure 2B:
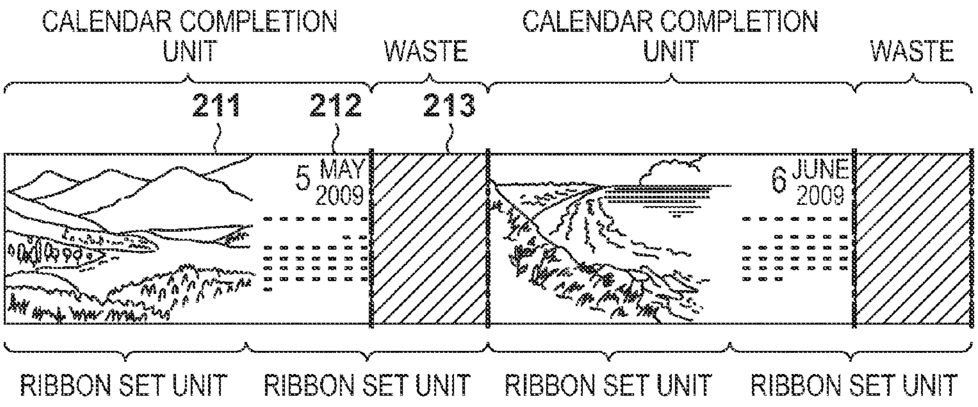

If the calendar layout selected by the user is not to print one month with 1.5 ribbon sets, the process shifts to normal printing (step S524). Step S524 is processing executed when the length of the image and date areas on each of the first and second calendar sheets does not have a relationship of 1 or 0.5 times of the unit length. For example, when printing with 1 ribbon set, the process shifts to normal printing (step S524) to print a calendar sheet of one month with 1 ribbon set. Normal printing is performed as shown in FIG. 2B. More specifically, the printing apparatus 300 rotates the grip roller 404-1 clockwise to convey the first ribbon set (first cycle) start position of the roll paper 403 to the printing position 411. Upon completion of the conveyance, the printing apparatus 300 prints an image area 211 of the first calendar sheet in the area of the first ribbon set. Then, the printing apparatus 300 prints the date area in a left area 221 of the second ribbon set (second cycle) and prints the remaining printable area as an unprinted area 213. In the same fashion, the printing apparatus 300 prints the image area of the second calendar sheet in the area of the third ribbon set (third cycle). The printing apparatus 300 prints the date area in the left area of the fourth ribbon set (fourth cycle) and prints the remaining printable area as an unprinted area. After printing, the grip roller 404-1 and discharge roller 406 convey the calendar end position of the roll paper 403 to the cutter unit position. The cutter blade 409 and cutter bed blade 410 cut the roll paper, ending printing.

If the calendar layout is to print one month with 1.5 ribbon sets, the printing apparatus 300 rotates the grip roller 404-1 clockwise to convey the first ribbon set start position of the roll paper 403 to the printing position 411. Upon completion of the conveyance, the printing apparatus 300 prints the image area of the first calendar sheet in the normal orientation with the first ribbon set (first cycle) (step S514).

After the end of printing with the first ribbon set, the printing apparatus 300 determines whether calendar printing designated by the user is to print two months successively (step S515). If calendar printing is to print two months successively, the printing apparatus 300 rotates the grip roller 404-1 clockwise to convey, to the printing position 411, the second ribbon set start position of the roll paper 403 bearing the image area of the first calendar sheet. Upon completion of the conveyance, the printing apparatus 300 prints the date area of the first calendar sheet in the normal orientation with the second ribbon set (second cycle), and prints the date area of the second calendar sheet in an orientation rotated through 180° (step S516).

After the end of printing with the second ribbon set, the grip roller 404-1 and discharge roller 406 convey the calendar end position of the roll paper 403 to the cutting position of the cutter unit. Upon completion of the conveyance, the cutter blade 409 and cutter bed blade 410 cut the roll paper 403 (step S517), completing calendar printing of the first sheet.

After cutting, the printing apparatus 300 rotates the grip roller 404-1 clockwise to convey the third ribbon set start position of the roll paper 403 to the printing position 411. Upon completion of the conveyance, the printing apparatus 300 prints the image area of the second calendar sheet with the third ribbon set (third cycle) in an orientation rotated through 180° (step S518). After the end of printing with the third ribbon set, the grip roller 404-1 and discharge roller 406 convey the second calendar sheet end position of the roll paper 403 to the cutter unit position. Upon completion of the conveyance, the cutter blade 409 and cutter bed blade 410 cut the roll paper 403 (step S519), completing calendar printing of the second sheet.

Upon completion of calendar printing of the second sheet, the printing apparatus 300 determines whether calendar printing for the period of the designated year and months has ended (step S520). If calendar printing for the period of the designated year and months has ended, the calendar printing is completed. If calendar printing for the period of the designated year and months has not ended, an odd-numbered calendar sheet of the next month is printed with the first ribbon set (step S514).

If calendar printing designated by the user is not successive printing of two months but printing of a single month in step S515, the printing apparatus 300 prints the date area of the first calendar sheet in the normal orientation with the second ribbon set, and leaves the remaining margin area unprinted (step S521). After the end of printing with the second ribbon set, the grip roller 404-1 and discharge roller 406 convey the first calendar sheet end position of the roll paper 403 to the cutter unit position. Upon completion of the conveyance, the cutter blade 409 and cutter bed blade 410 cut the roll paper 403 (step S522). Similarly, the roll paper 403 is cut at the end of the unprinted area (step S523), completing calendar printing.

The contents of the operation in the first embodiment will be summarized. First, in printing with a first ribbon set 101, the image area of the first sheet is printed in the normal orientation. Then, in printing with a second ribbon set 102, the date area of the first month is printed in the normal orientation, and the date area of the second month is printed in an orientation rotated through 180°. After the end of printing with the second ribbon set, the roll paper is cut at a calendar end position 104 corresponding to the second ribbon set, ending calendar printing of the first month. In printing with a third ribbon set 103, the image area of the second sheet is printed in the orientation rotated through 180°. After the end of printing with the third ribbon set, the roll paper is cut at a calendar end position 105.

This printing prevents generation of a boundary between ribbon set units in the middle of an image area such as a picture, and thus generation of an unnatural picture. Since no unprinted area is generated, neither the roll paper 403 nor ink ribbon 412 is wasted.

(Second Embodiment)

Figure 1B:
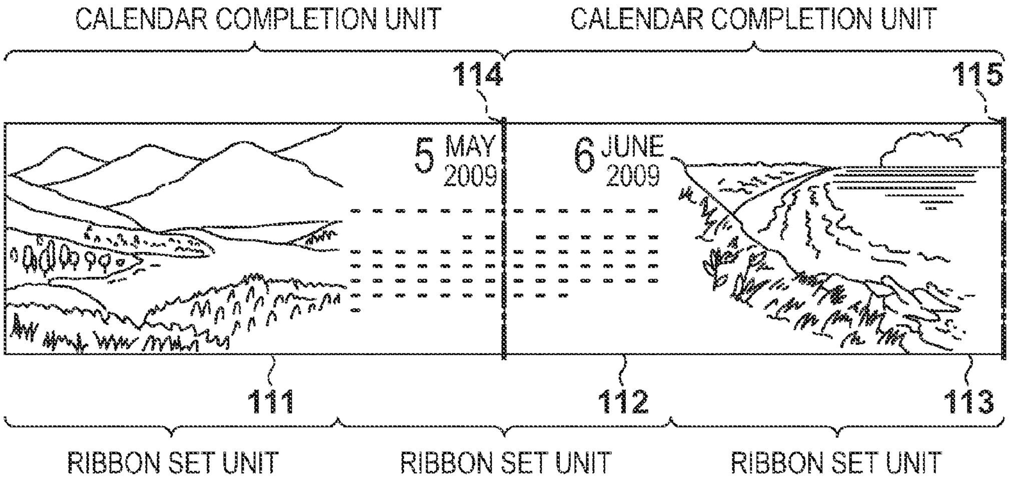

FIG. 1B exemplifies a printing result according to the second embodiment. In FIG. 1B, a calendar sheet of the first month (first sheet) and that of the second month (second sheet) are opposite in the horizontal positions of the image and date areas.

Figure 6A:
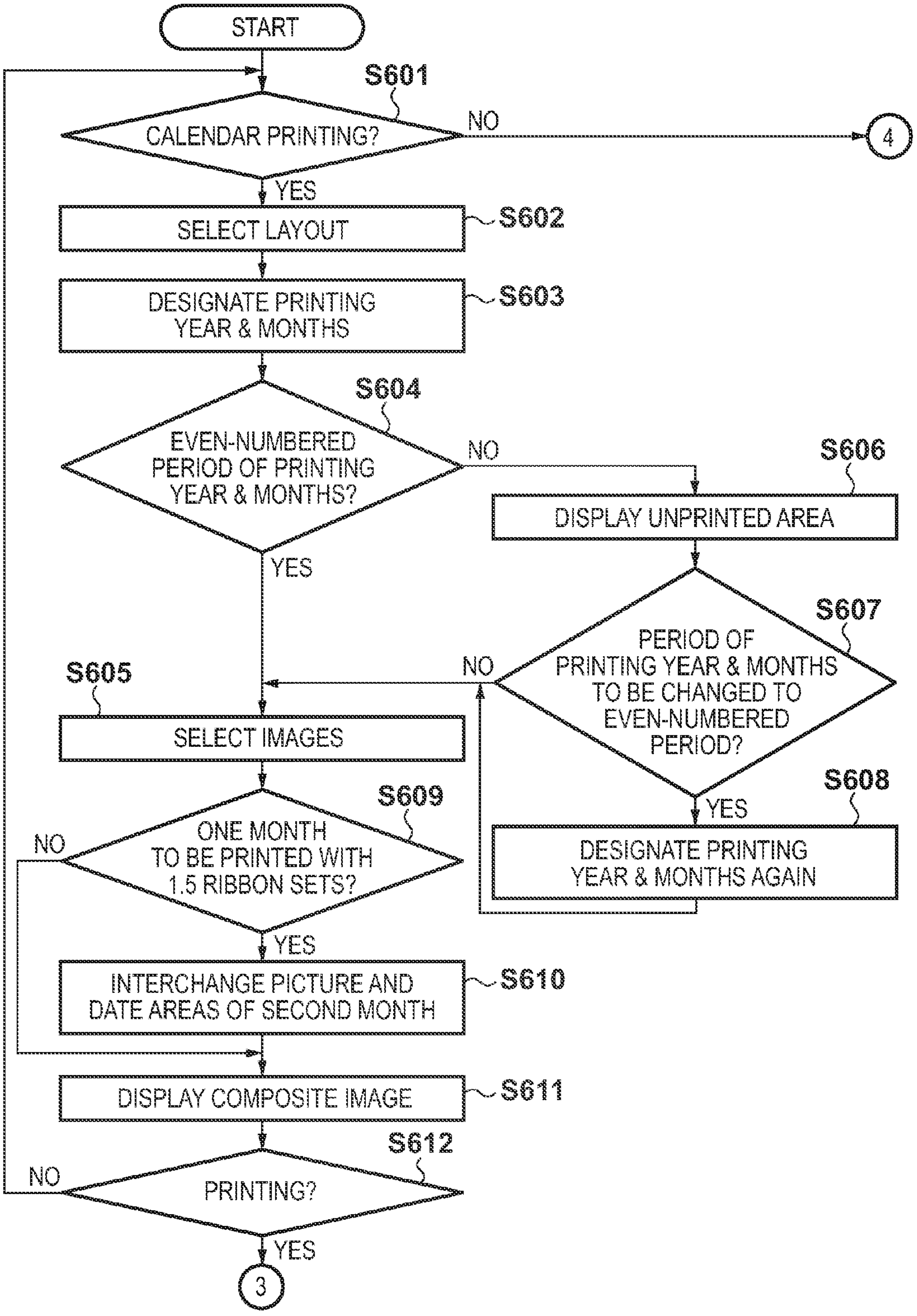
FIGS. 6A and 6B are flowcharts showing calendar printing in the second embodiment.
Figure 6B:
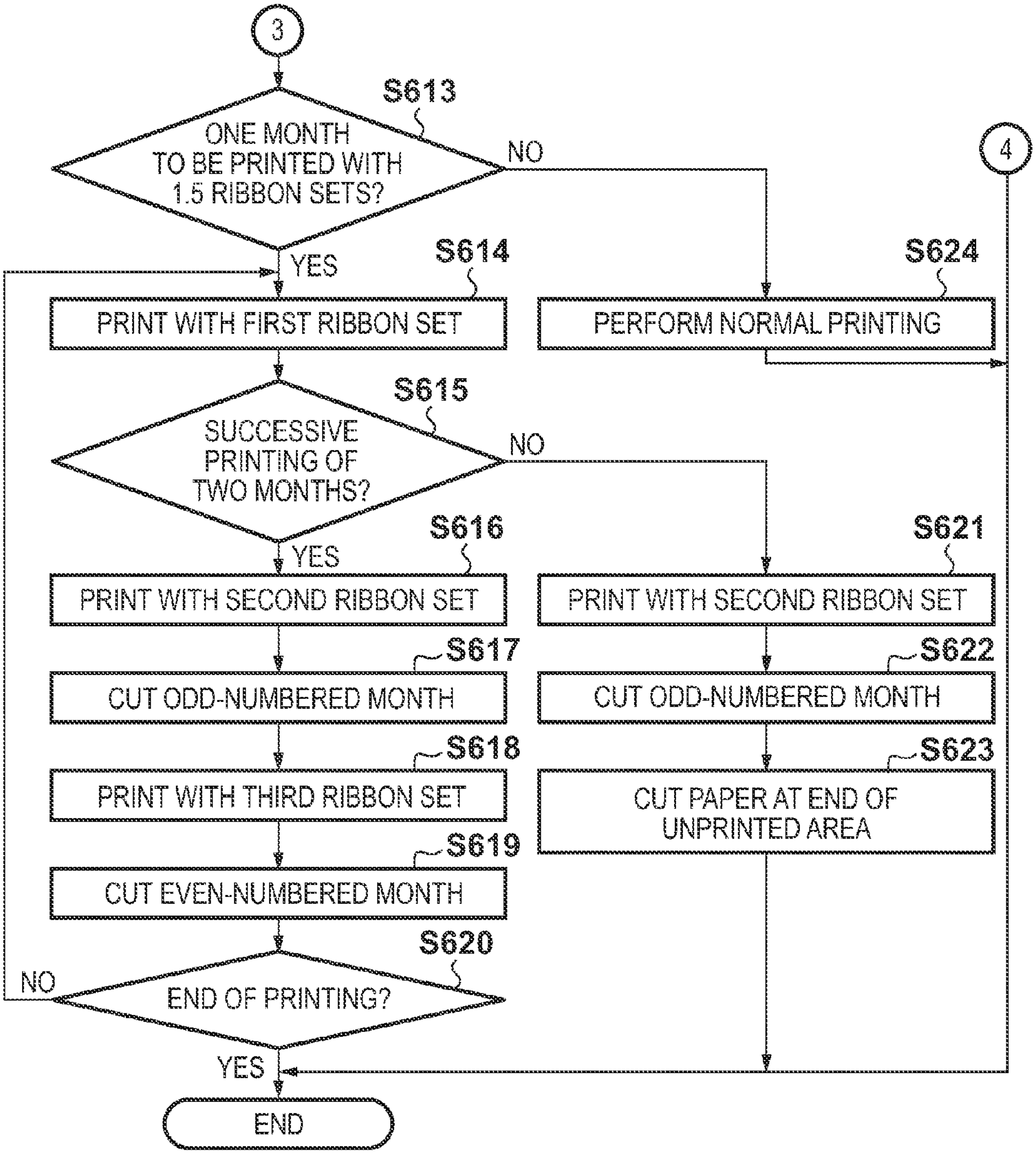

FIGS. 6A and 6B are flowcharts showing calendar printing in the second embodiment. Steps S601 to S609 in this flowchart are the same as steps S501 to S509 in FIG. 5A, and a description thereof will not be repeated. When printing a calendar sheet of one month with 1.5 ribbon sets, a printing apparatus 300 creates calendar composite image data in which the first calendar sheet is set in the normal orientation and the image and date areas of the second calendar sheet are interchanged with each other (step S610). The printing apparatus 300 displays the created calendar composite image on a display unit 302 (step S611), and the user can confirm it. When confirming the calendar composite image on the display unit 302, it is desirable to notify the user that the positions of the image and date areas are reversed between the first and second sheets. When the first sheet becomes redundant in print processing, it is desirable to notify the user again that an unprinted area will be generated.

Steps S612 to S615 and S624 in this flowchart are the same as steps S512 to S515 and S524 in FIG. 5B, and a description thereof will not be repeated.

If two months are to be printed successively (YES in step S615), the printing apparatus 300 rotates a grip roller 404-1 clockwise to convey, to a printing position 411, the second ribbon set start position of roll paper 403 bearing the image area of the first calendar sheet. Upon completion of the conveyance, the printing apparatus 300 prints the date areas of the first and second calendar sheets in the normal orientation (step S616).

After the end of printing with the second ribbon set, the grip roller 404-1 and a discharge roller 406 convey the first calendar sheet end position of the roll paper 403 to the cutter unit position. Upon completion of the conveyance, a cutter blade 409 and cutter bed blade 410 cut the roll paper 403 (step S617), completing calendar printing of the first sheet.

After cutting, the printing apparatus 300 rotates the grip roller 404-1 clockwise to convey the third ribbon set start position of the roll paper 403 to the printing position 411. Upon completion of the conveyance, the printing apparatus 300 prints the image area of the second calendar sheet with the third ribbon set in the normal orientation (step S618). After the end of printing with the third ribbon set, the grip roller 404-1 and discharge roller 406 convey the second calendar sheet end position of the roll paper 403 to the cutter unit position. Upon completion of the conveyance, the cutter blade 409 and cutter bed blade 410 cut the roll paper 403 (step S619), completing calendar printing of the second sheet.

Steps S620 to S623 in this flowchart are the same as steps S520 to S523 in FIG. 5B, and a description thereof will not be repeated.

The contents of the operation in the second embodiment will be summarized. First, in printing with a first ribbon set 111, the image area of the first sheet is printed in the normal orientation. Then, in printing with a second ribbon set 112, data in which the date areas of the first and second months are adjacent to each other is created and printed in the normal orientation. After the end of printing with the second ribbon set, the roll paper is cut at a calendar end position 114 corresponding to the second ribbon set, ending calendar printing of the first month. In printing with a third ribbon set 113, the image area of the second sheet is printed in the normal orientation. After the end of printing with the third ribbon set, the roll paper is cut at a calendar end position 115.

Similar to the first embodiment, this printing prevents generation of a boundary between ribbon set units in the middle of an image area, and thus generation of an unnatural picture. Since no unprinted area is generated, neither the roll paper 403 nor an ink ribbon 412 is wasted.

(Third Embodiment)

Figure 7A:
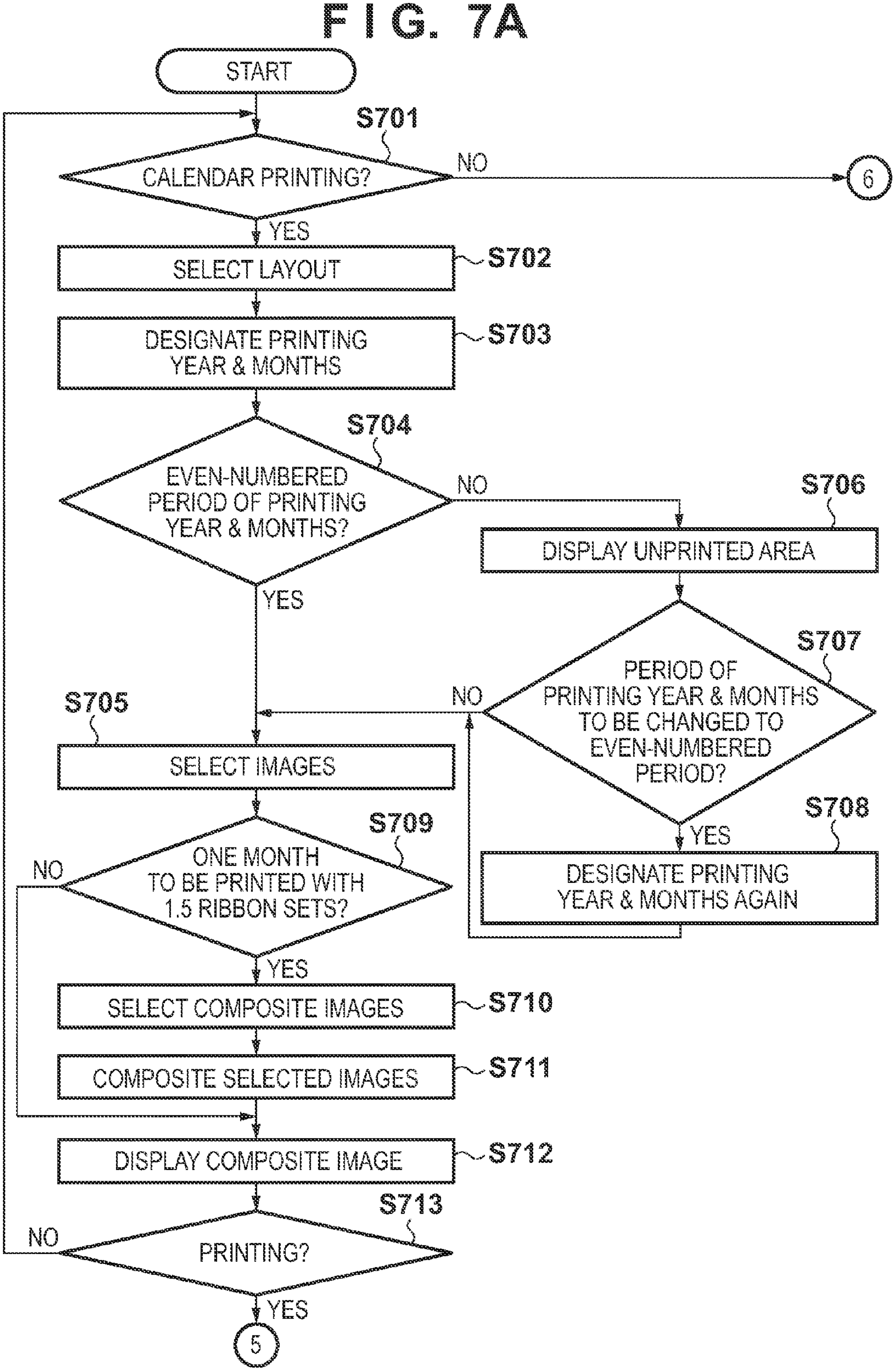
FIGS. 7A and 7B are flowcharts showing calendar printing in the third embodiment.
Figure 7B:
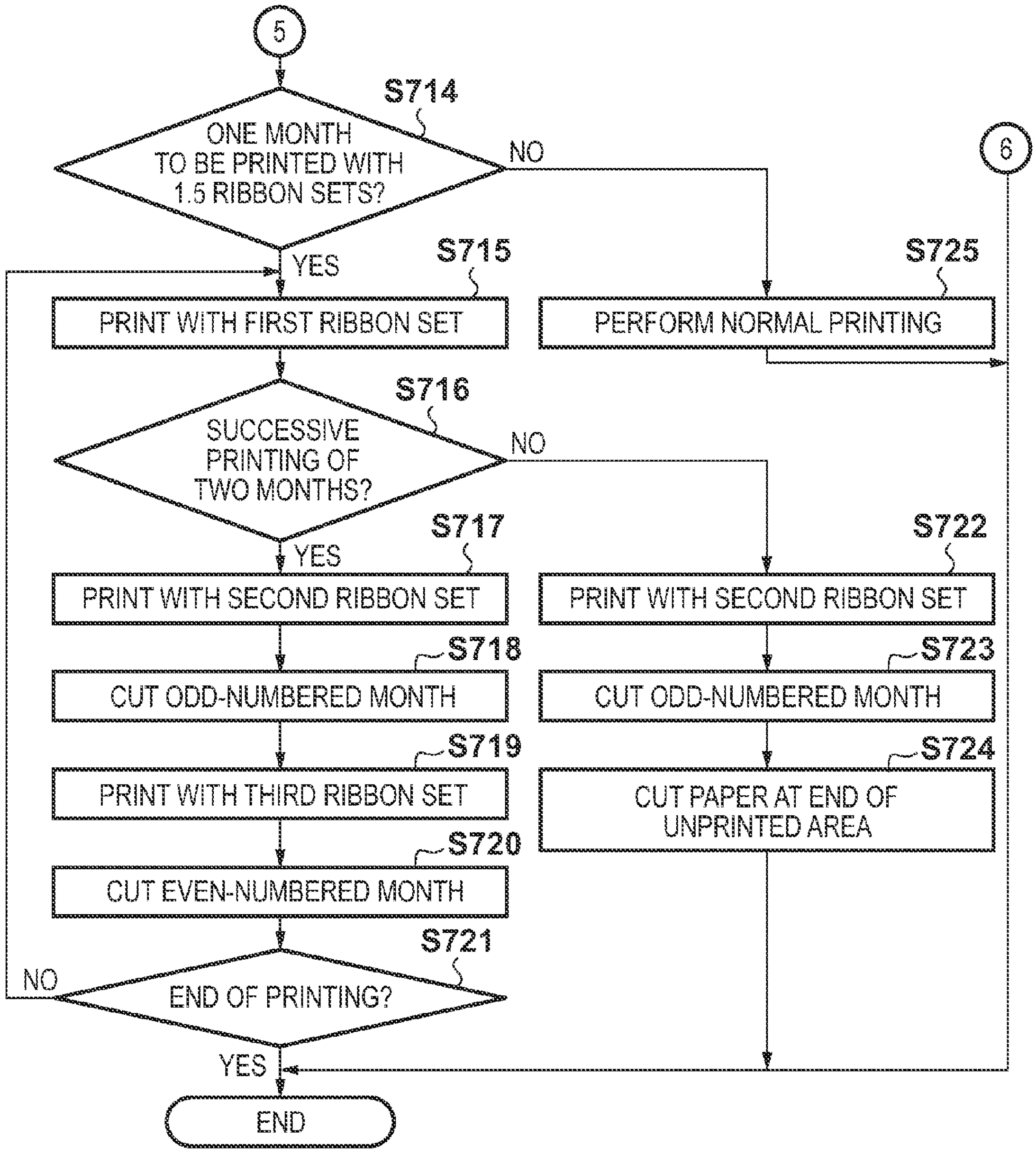

The third embodiment allows the user to select which of the method according to the first embodiment and that according to the second embodiment is to be adopted. FIGS. 7A and 7B are flowcharts showing calendar printing in the third embodiment. Steps S701 to S709 in this flowchart are the same as steps S501 to S509 in FIG. 5A, and a description thereof will not be repeated. When printing a calendar sheet of one month with 1.5 ribbon sets, the user selects the two-month successive printing method according to the first embodiment or that according to the second embodiment (step S710). If the user selects the two-month successive printing method according to the first embodiment, a printing apparatus 300 creates calendar composite image data in which the first calendar sheet is set in the normal orientation and the second calendar sheet is rotated through 180° (step S711). The subsequent sequence (steps S712 to S724) is the same as that (steps S512 to S524 in FIG. 5B) in the first embodiment, and a description thereof will not be repeated.

If the user selects the two-month successive printing method according to the second embodiment, the printing apparatus 300 creates calendar composite image data in which the first calendar sheet is set in the normal orientation and the image and date areas of the second calendar sheet are interchanged with each other (step S711). The subsequent sequence (steps S712 to S724) is the same as that (steps S612 to S624 in FIG. 6B) in the second embodiment, and a description thereof will not be repeated.

(Fourth Embodiment)

A measure when roll paper runs short in the above-described calendar printing will be explained.

For example, Japanese Patent Laid-Open No. 2007-021748 discloses a processing sequence when paper runs out in an apparatus which prints folding forms of three pages. The technique described in Japanese Patent Laid-Open No. 2007-021748 adopts a paper sensor and a residual holding memory. When there is no paper sufficient for successive forms (for three pages) necessary for printing, no printing is done.

Japanese Patent Laid-Open No. 08-112953 discloses a processing sequence upon generation of a label end error in a printing apparatus for label paper wound like a roll. According to the technique described in Japanese Patent Laid-Open No. 08-112953, even when a label end error occurs during conveyance of paper to a cutting position after the end of printing, the conveyance of the paper to the cutting position continues and the paper is cut, obtaining a completed printed material.

However, the techniques disclosed in Japanese Patent Laid-Open Nos. 2007-021748 and 08-112953 require a paper sensor for managing the remaining paper amount, a memory for holding the residual value, and the like. This complicates the apparatus arrangement and raises the cost of the printing system. Undesirably, printing itself is not executed unless paper enough for the number of sheets to obtain completed printed materials is prepared. Further, excessive paper is consumed to obtain completed materials upon completion of printing, which is not preferable in terms of ecology.

To solve this, the fourth embodiment provides a processing sequence capable of performing processing with a simple apparatus arrangement when the roll paper (to be also simply referred to as "paper") or ink ribbon runs out in calendar printing as described above, and preventing waste of the paper or ink ribbon.

Figure 8A:
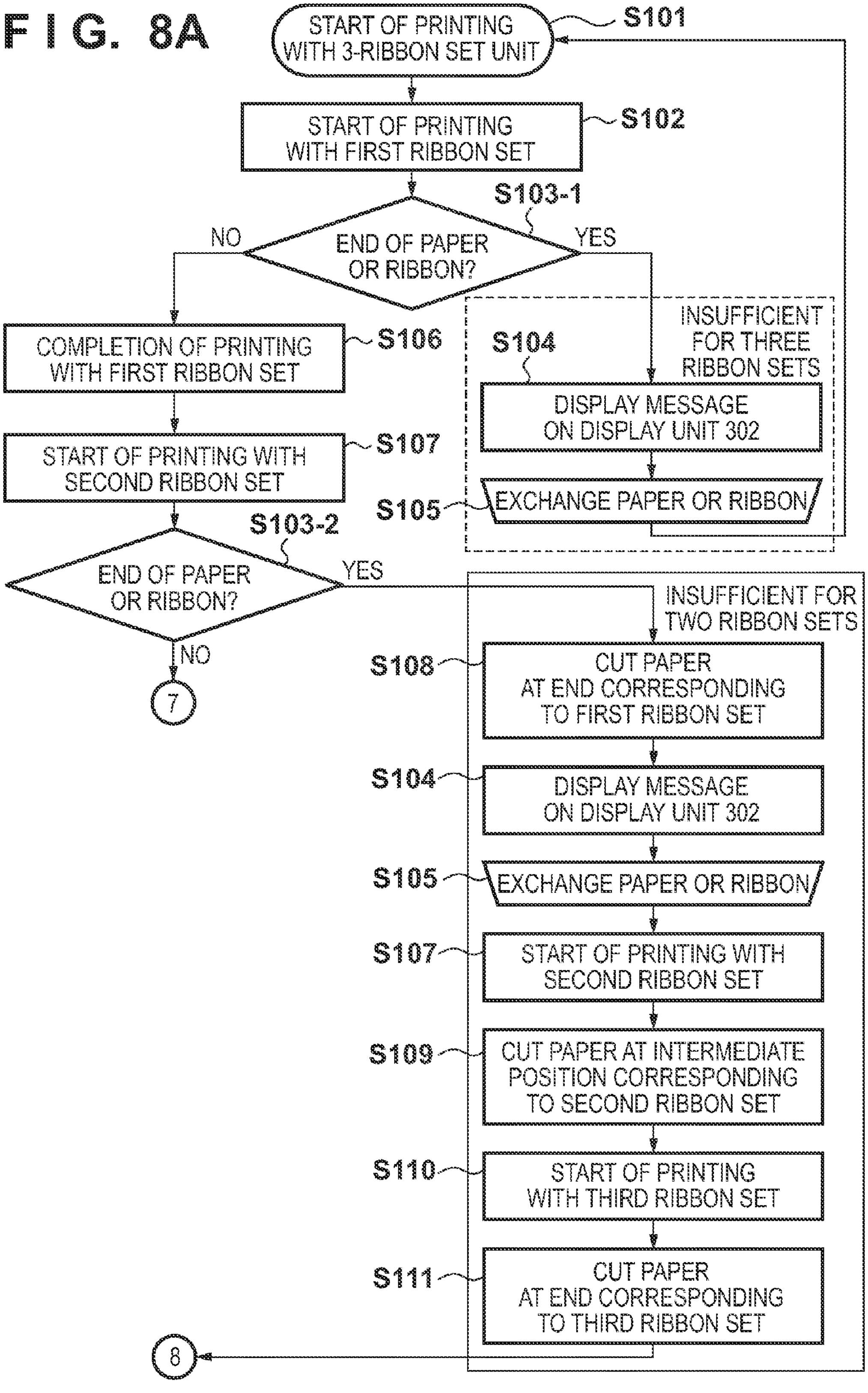
FIGS. 8A and 8B are flowcharts including processing when the paper or ink ribbon runs out during calendar printing in the fourth embodiment.
Figure 8B:
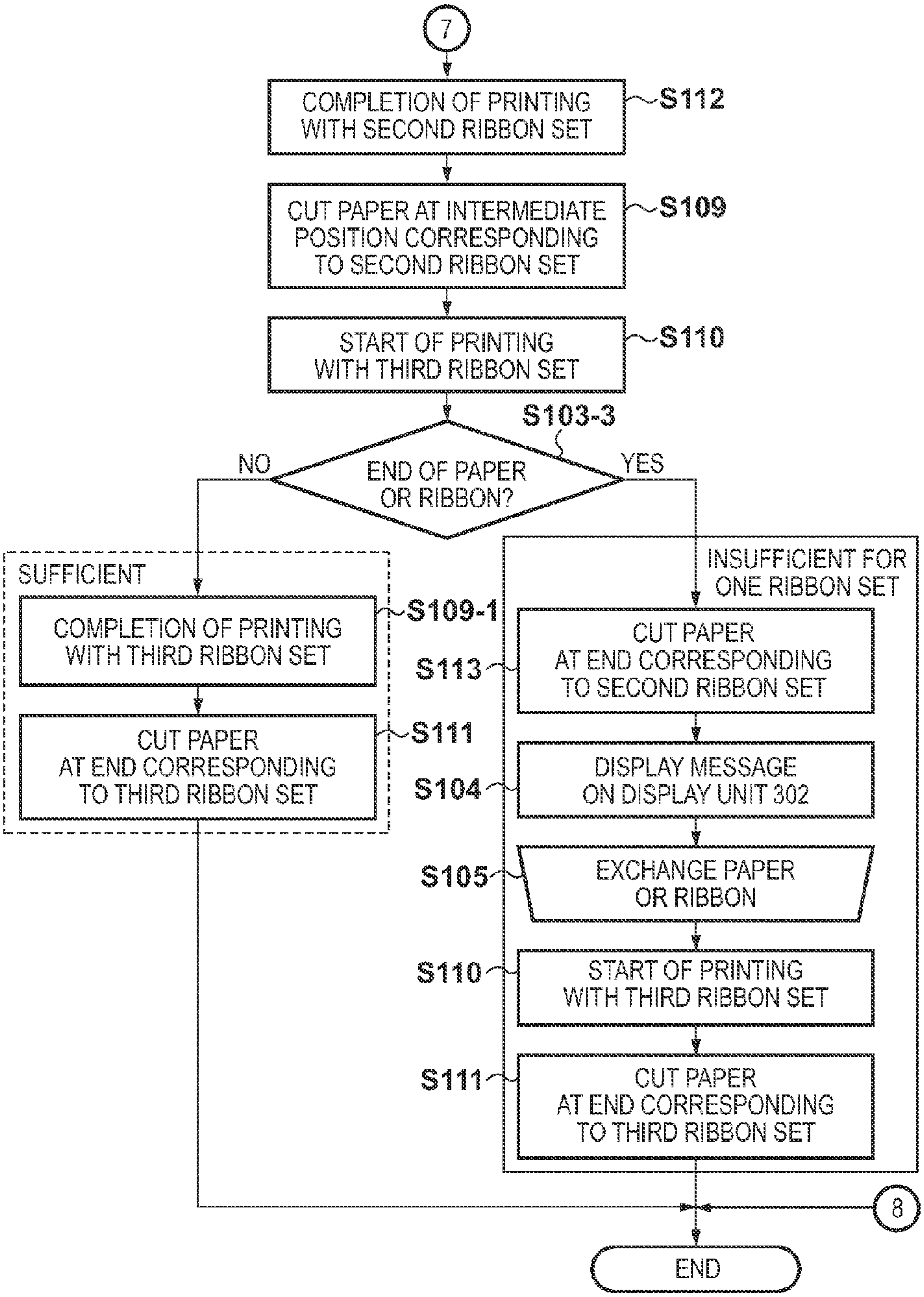

The processing sequence of calendar printing with a 3-ribbon set unit according to the fourth embodiment will be explained with reference to FIGS. 8A and 8B. The user selects months (for example, two successive months) to be printed and pictures (for example, two pictures) to be printed, and starts a print job using a 3-ribbon set unit (step S101). Printing with the first ribbon set starts (step S102), and it is determined whether the paper or ink ribbon will run short during printing (step S103-1). This determination is made by pulling out paper to a start position and determining the presence of a hole indicating the final position of the paper in accordance with an output signal from an optical sensor 450. A seal is sometimes used instead of the hole formed in paper. When the ink ribbon cannot be taken up anymore, it is determined that the ink ribbon has run out.

If it is determined that the ink ribbon or paper has run out (insufficient for three ribbon sets), the print job stops at the time, and a display unit 302 displays a message which prompts the user to exchange the ink ribbon or paper (step S104). After the user exchanges the ink ribbon or paper (step S105), the print job using the 3-ribbon set unit starts again (step S101). If NO in the first determination (step S103-1) of whether the paper or ink ribbon has run out, the print operation continues, completing printing with the first ribbon set (step S106).

Then, printing with the second ribbon set starts (step S107). The second determination of whether the paper or ink ribbon has run out during printing with the second ribbon set is made (step S103-2). If it is determined that the ink ribbon or paper has run out, the paper is cut at the first ribbon set printing completion position (first cutting) (step S108). The display unit 302 displays a message to exchange the ink ribbon or paper (step S104). After the user exchanges the ink ribbon or paper (step S105), printing with the second ribbon set starts again (step S107). After executing printing with the second ribbon set, the paper is cut at the intermediate position of the second ribbon set printed material (that is, the end position of the first calendar sheet) (second cutting) (step S109). Then, printing with the third ribbon set starts (step S110). Upon completion of printing with the third ribbon set, the paper is cut at the end position of the second calendar sheet regarding printing with the third ribbon set (third cutting) (S111).

The above steps S108 to S111 are a sequence regarding printing and paper cutting when the ink ribbon or paper is insufficient for two ribbon sets. Printing, paper cutting, and a completed printed material obtained upon completion of processing will be explained in detail with reference to FIGS. 9A to 9C.

Figure 9A:
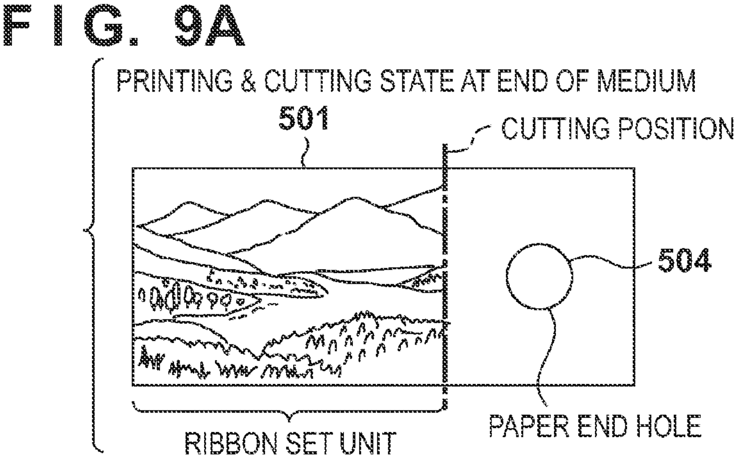
FIGS. 9A to 9C are views for explaining a printing & paper cutting method when the paper or ink ribbon is insufficient for two ribbon sets.

When printing with the first ribbon set is completed and it is determined that the ink ribbon or paper has run out during printing with the second ribbon set, the paper is cut at the end position upon completion of printing with the first ribbon set, as shown in FIG. 9A. As a result, an image area 501 is obtained as a completed printed material. A hole 504 indicates the end of the paper.

Figure 9B:
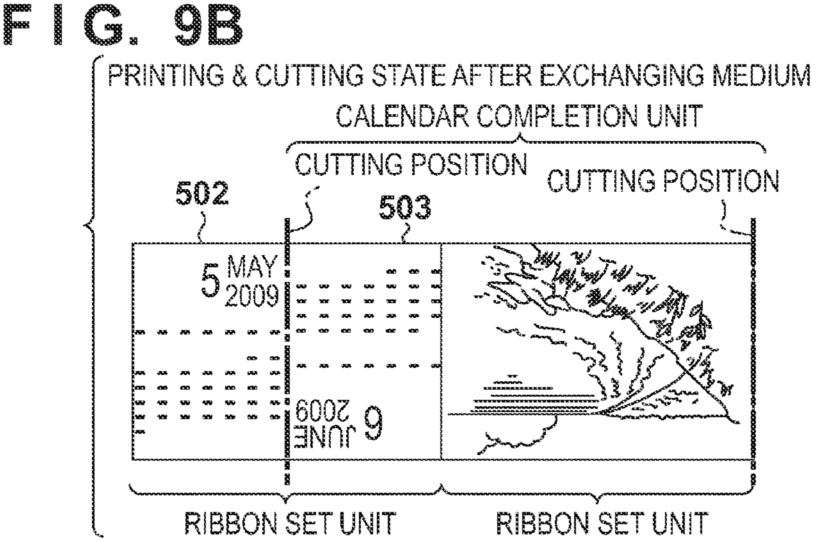

Processing regarding printing and paper cutting after the user exchanges the ink ribbon or paper will be explained with reference to FIG. 9B. The date areas of two months are printed with the second ink ribbon set. Upon completion of printing, the paper is cut at the intermediate position of a material printed with the second ink ribbon set, obtaining a date area 502 of one month. An image area is then printed with the third ink ribbon set. Upon completion of printing, the paper is cut at the end position of the material printed with the third ink ribbon set, obtaining a calendar sheet 503 on which the image and date areas are completed by one sheet.

Figure 9C:
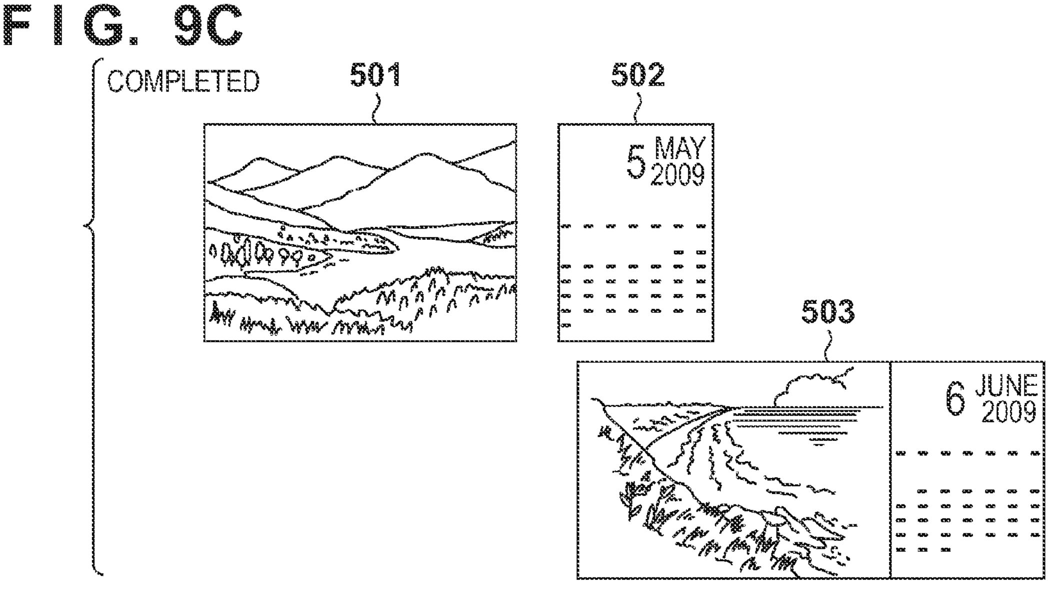

FIG. 9C shows a printing completion state after printing and cutting. The image area 501 and date area 502 are separated, and used as a calendar sheet by laying them side by side. The calendar sheet 503 can be used directly because the image and date areas are completed by one sheet.

Figure 10A:
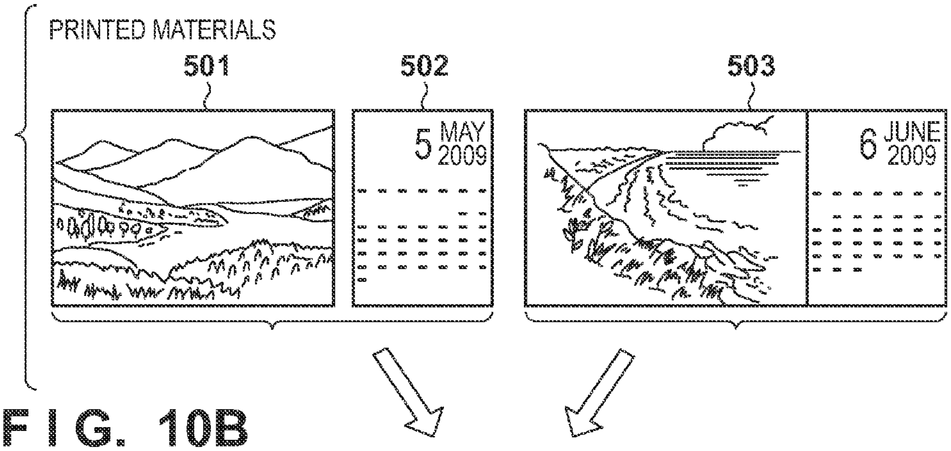
FIGS. 10A to 10C are views for explaining a use example of completed printed materials when the paper or ink ribbon is insufficient for two ribbon sets.
Figure 10B:
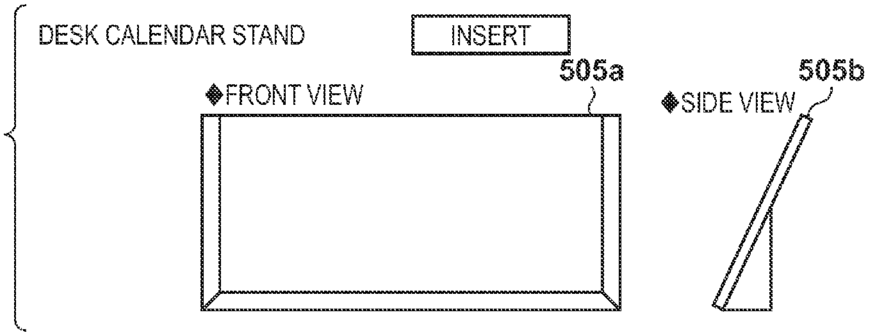

Actual use of these calendar sheets as a desk calendar will be described with reference to FIGS. 10A to 10C. As shown in FIG. 10A, the obtained printed materials are the calendar sheet 503 on which the image and date areas are completed by one sheet, and the image area 501 and date area 502 which are created on separate paper sheets. When using these printed materials as a calendar, they are inserted into a desk calendar stand indicated by 505*a* (front view) and 505*b* (side view) shown in FIG. 10B.

Figure 10C:
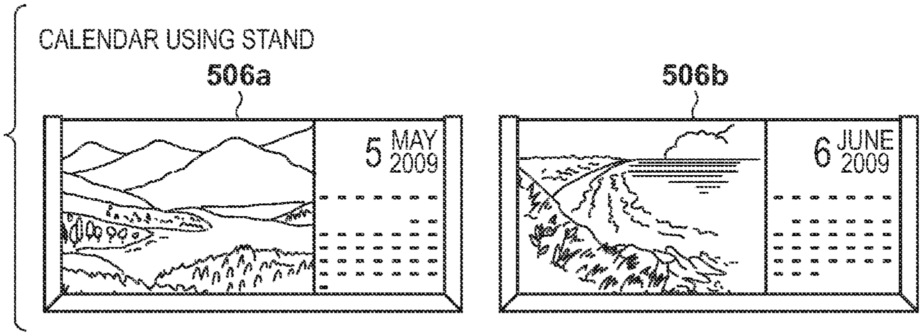

The calendar sheet 503 on which the image and date areas are completed by one sheet is used as represented by 506*b* in FIG. 10C. Even the image area 501 and date area 502 which are completed by separate paper sheets are used as represented by 506*a* in FIG. 10C. Even image and date areas created on separate paper sheets can be used without any practical problem.

A sequence regarding printing and paper cutting when the ink ribbon or paper is insufficient for one ribbon set will be explained with reference to FIGS. 8A and 8B. The user selects months (for example, two successive months) to be printed and pictures (for example, two pictures) to be printed, and starts a print job using a 3-ribbon set unit (step S101). Printing with the first ribbon set starts (step S102), and the first determination of whether the paper or ink ribbon has run out during printing is made (step S103-1). If the paper or ink ribbon is insufficient for one ribbon set, printing is done with the first ribbon set, completing printing with the first ribbon set (step S106).

Then, printing with the second ribbon set starts (step S107). The second determination of whether the paper or ink ribbon has run out during printing is made (step S103-2). In this case, it is determined that usable parts of both the paper and ink ribbon remain, and printing with the second ribbon set continues and is completed (step S112). Since printing up to the second ribbon set has been completed, the paper is cut at the intermediate position of the second ribbon set printed material (that is, the end position of the first calendar sheet) (fourth cutting) (step S109).

Thereafter, printing with the third ribbon set starts (step S110). The third determination of whether the paper or ink ribbon has run out during printing with the third ribbon set is made (step S103-3). In this case, it is determined that the paper or ink ribbon will run short during printing with the third ribbon set. Since printing up to the second ribbon set has been completed, the paper is cut at the second ribbon set printing completion position (fifth cutting) (step S113). The display unit 302 displays a message to exchange the ink ribbon or paper (step S104). After the user exchanges the ink ribbon or paper (step S105), printing with the third ribbon set starts again (step S110). Upon completion of printing with the third ribbon set, the paper is cut at the end position of the third ribbon set printed material (sixth cutting) (S111).

A sequence regarding printing and paper cutting when the ink ribbon or paper is insufficient for one ribbon set has been described. Printing, paper cutting, and a completed printed material obtained upon completion of processing will be explained in detail with reference to FIGS. 11A to 11C.

Figure 11A:
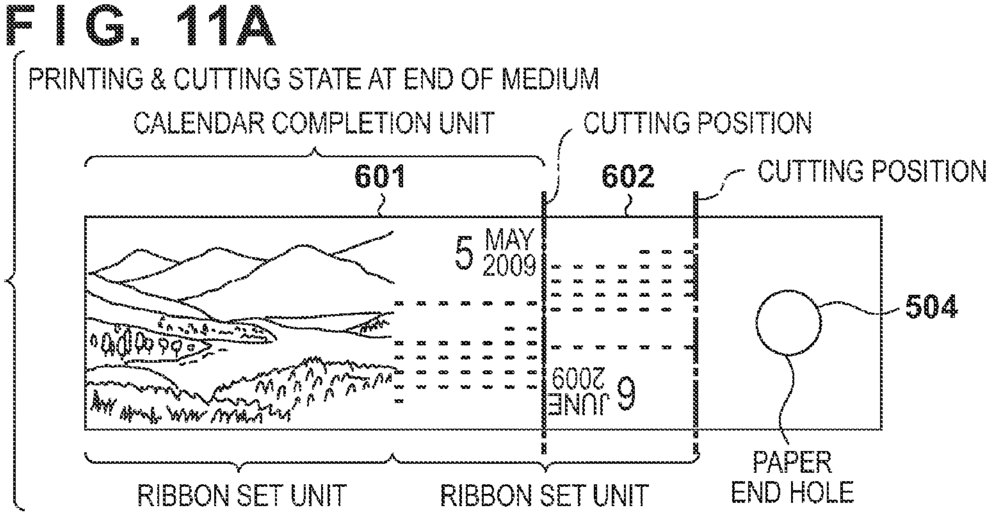
FIGS. 11A to 11C are views for explaining a printing & paper cutting method when the paper or ink ribbon is insufficient for one ribbon set.

When printing with the first and second ribbon sets is completed and it is determined that the ink ribbon or paper has run out during printing with the third ribbon set, the paper is cut at the intermediate position in the second ribbon set printing completion state, as shown in FIG. 11A. As a result, a calendar sheet 601 on which the image and date areas are integrated is obtained as a completed printed material. Further, the paper is cut at the end position, obtaining a date area 602 as a completed printed material. A hole 604 indicates the end of the paper.

Figure 11B:
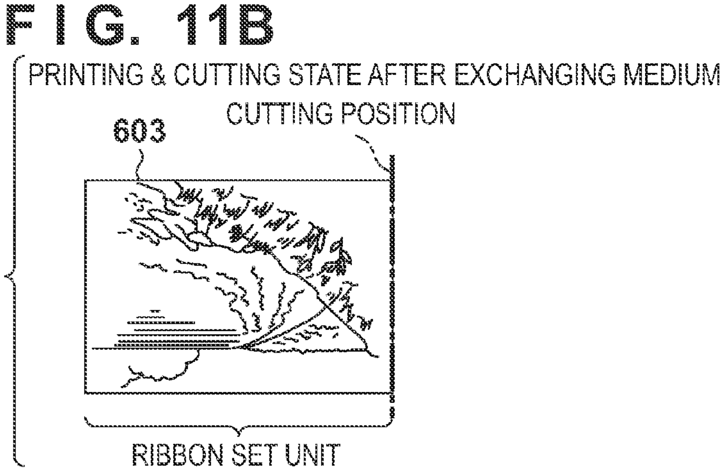

Processing regarding printing and paper cutting after the user exchanges the ink ribbon or paper will be explained with reference to FIG. 11B. An image area is printed with the third ink ribbon set. Upon completion of printing, the paper is cut at the end position of the material printed with the third ink ribbon set, obtaining an image area 603.

Figure 11C:
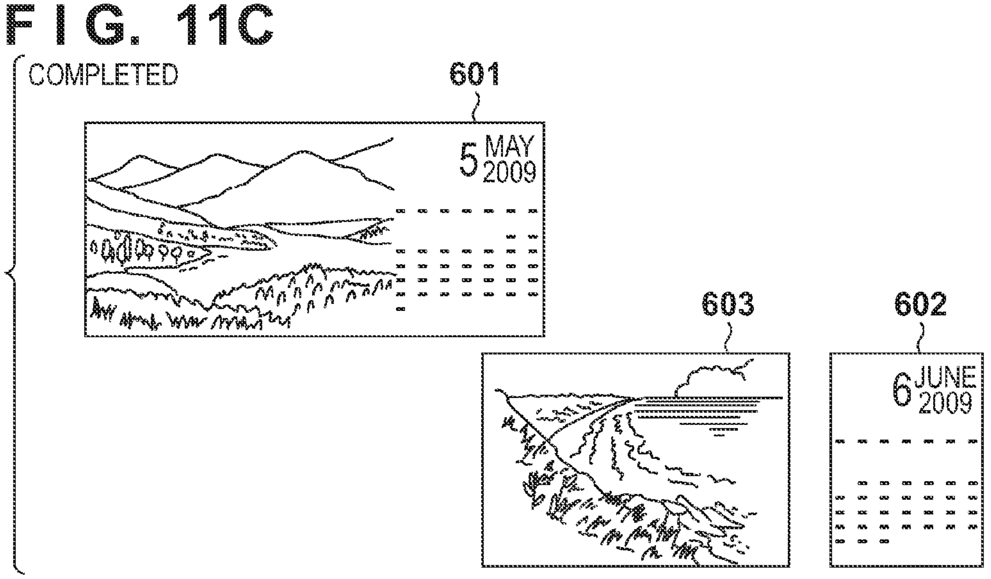

FIG. 11C shows a printing completion state after printing and cutting. The calendar sheet 601 can be used directly because the image and date areas are completed by one sheet. The image area 603 and date area 602 are separated, and used as a calendar sheet by laying them side by side.

Figure 12A:
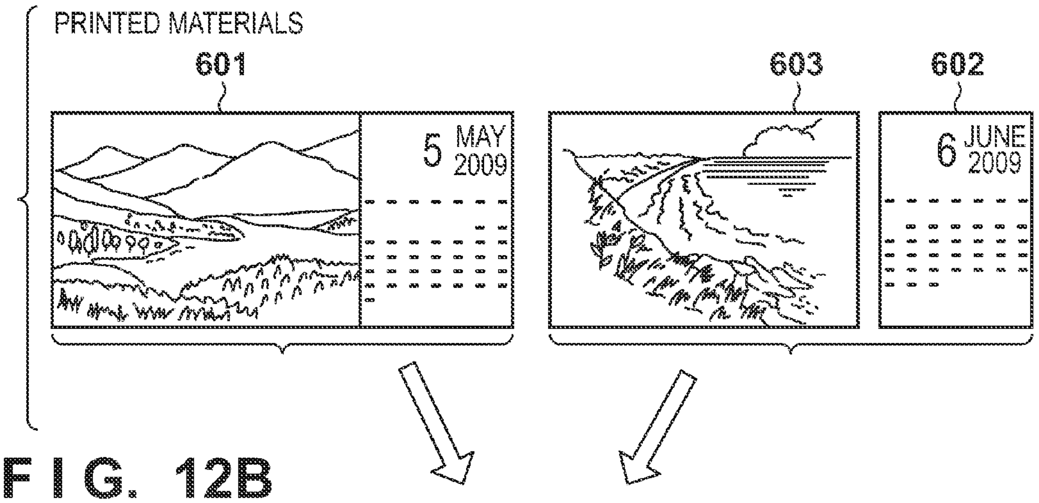
FIGS. 12A to 12C are views for explaining a use example of completed printed materials when the paper or ink ribbon is insufficient for one ribbon set.
Figure 12B:
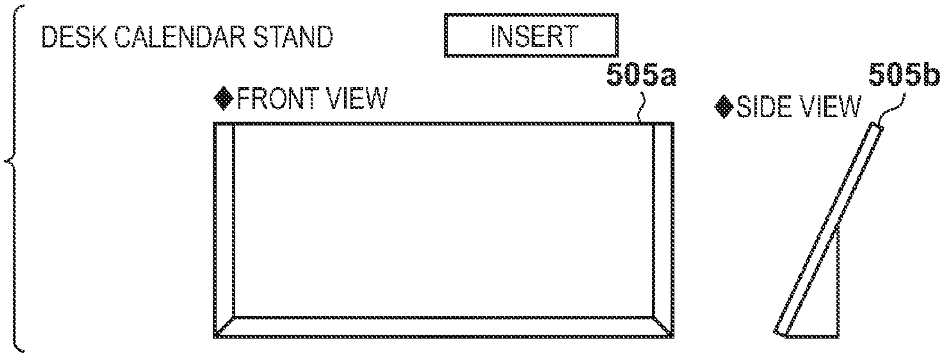

Actual use of these calendar sheets as a desk calendar will be described with reference to FIGS. 12A to 12C. As shown in FIG. 12A, the obtained printed materials are the calendar sheet 601 on which the image and date areas are completed by one sheet, and the image area 603 and date area 602 which are created on separate paper sheets. When using these printed materials as a calendar, they are inserted into the desk calendar stand indicated by 505*a* (front view) and 505*b* (side view) shown in FIG. 12B.

Figure 12C:
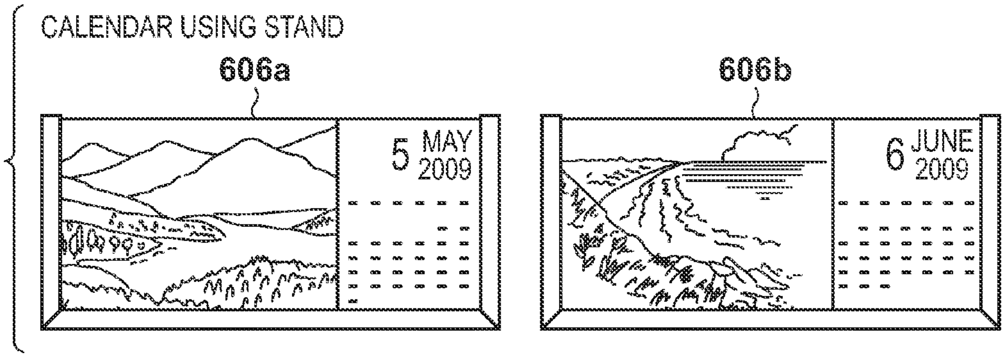

The calendar sheet 601 on which the image and date areas are completed by one sheet is used as represented by 606*a* in FIG. 12C. Even the image area 603 and date area 602 which are completed by separate paper sheets are used as represented by 606*b* in FIG. 12C. Even image and date areas created on separate paper sheets can be used without any practical problem.

When neither the paper nor ink ribbon runs short during calendar printing with three ribbon sets, printed materials as described in the first embodiment are obtained. In this case, all the three determinations (steps S103-1 to S103-3) of whether the paper or ink ribbon has run out are NO. Printing with the third ribbon set starts (step S110). If it is determined in step S103-3 that neither the paper nor ink ribbon runs short, printing with the third ribbon set continues and is completed (step S109-1). Finally, the paper is cut at the end position of the paper printed with the third ribbon set (step S111).

(Fifth Embodiment)

A modification of the processing sequence of calendar printing with a 3-ribbon set unit will be described. A difference from the fourth embodiment is that when the printed materials of image and date areas are obtained separately, a margin area can be created to connect them. The overall processing sequence is the same as the sequence in FIGS. 8A and 8B described in the fourth embodiment, and a description thereof will not be repeated.

Figure 13A:
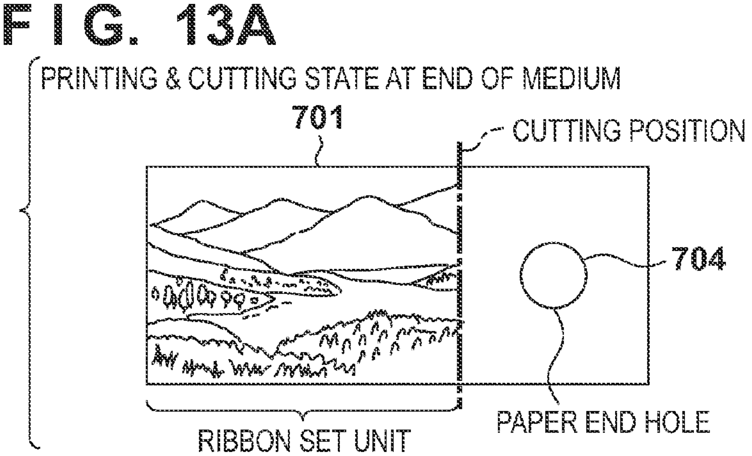
FIGS. 13A to 13C are views for explaining a printing & paper cutting method when the paper or ink ribbon is insufficient for two ribbon sets.

When printing has been done with only one ink ribbon, that is, the paper or ink ribbon is insufficient for two ribbon sets, the paper is cut at the end position upon completion of printing with the first ribbon set. FIG. 13A shows a resultant image area 701, similar to FIG. 9A. A hole 704 indicates the end of the paper.

Figure 13B:
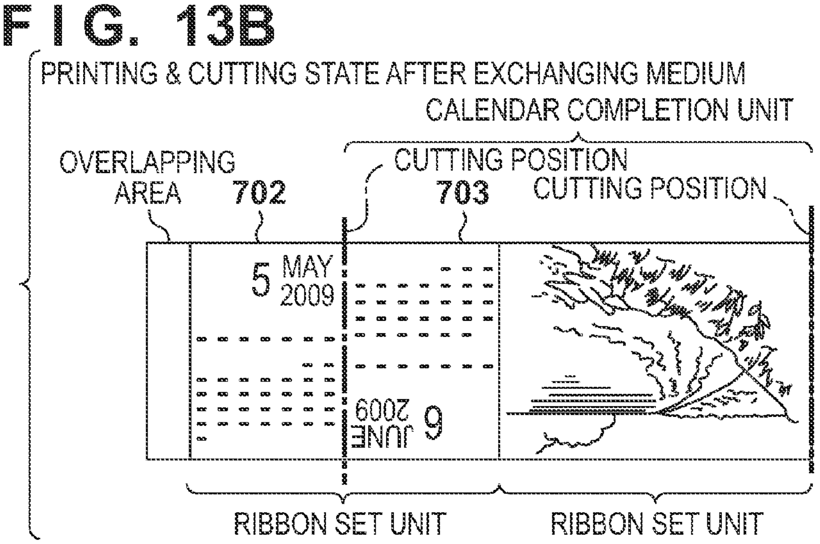
Figure 13C:
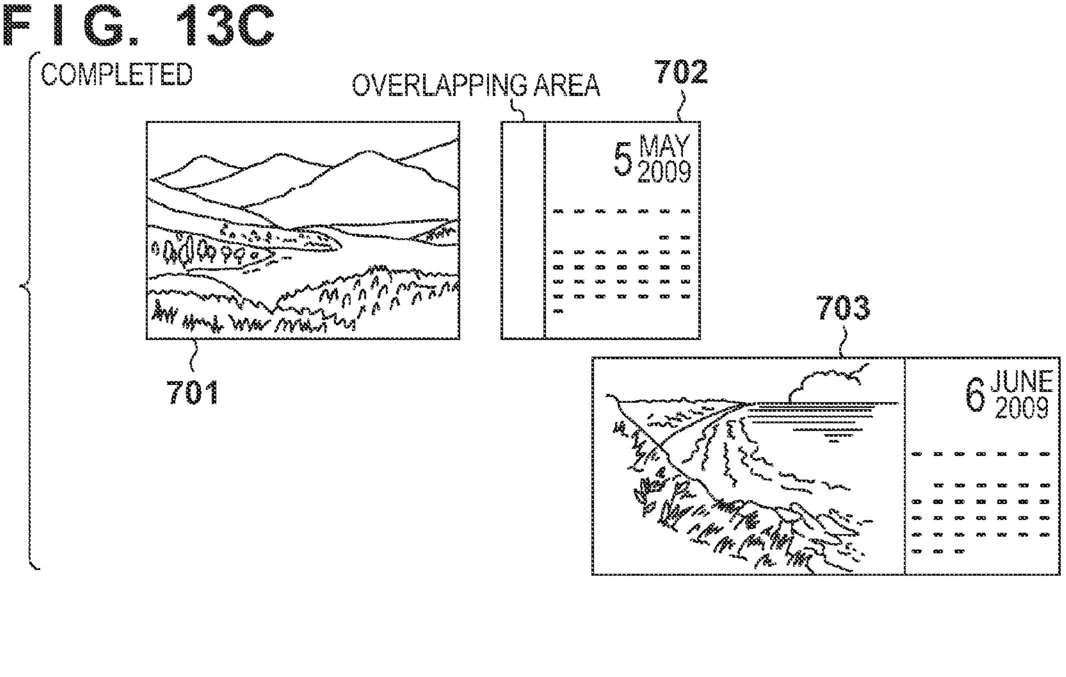
Figure 14A:
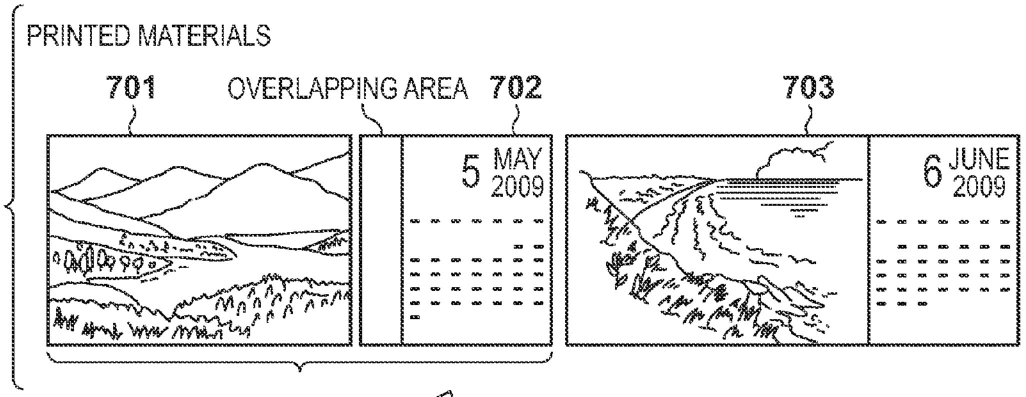
FIGS. 14A to 14C are views for explaining a use example of completed printed materials when the paper or ink ribbon is insufficient for two ribbon sets.
Figure 14B:
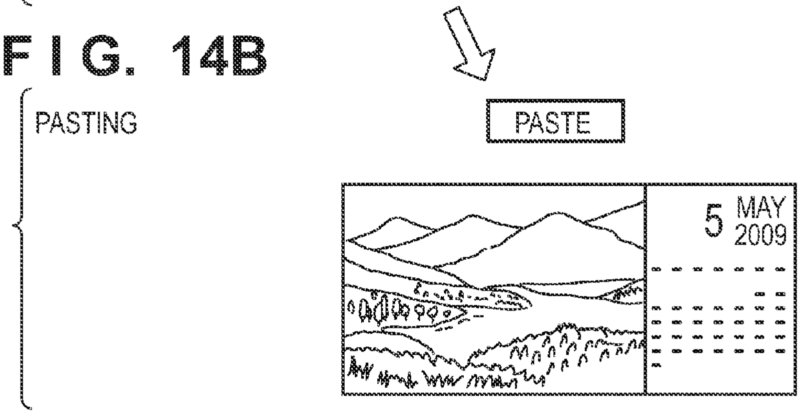
Figure 14C:
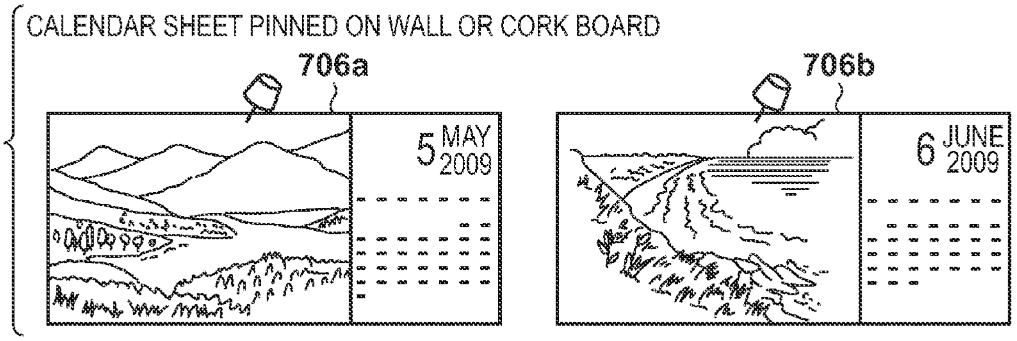

As shown in FIG. 13B, a margin area is formed on the left side of a printed material 702 of only the date area. By using this margin area, the image and date areas are pasted as shown in FIG. 14B. Then, even when the pasted image and date areas are pinned on the wall or a cork board, as shown in FIG. 14C, they can be used similarly to a calendar sheet on which the image and date areas are completed by one sheet, without any practical problem.

Figure 15A:
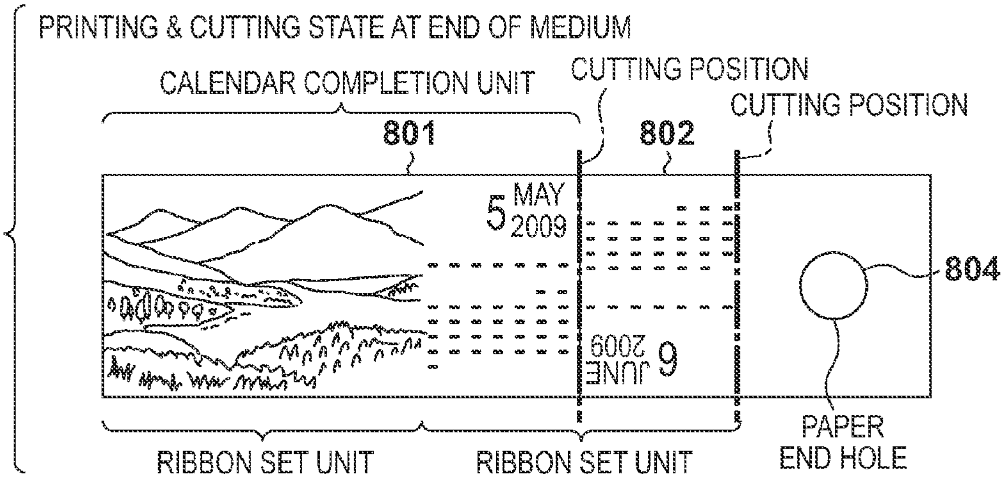
FIGS. 15A to 15C are views for explaining a printing & paper cutting method when the paper or ink ribbon is insufficient for one ribbon set.

When printing has been done with two ink ribbon sets, that is, the paper or ink ribbon is insufficient for one ribbon set, the paper is cut at the intermediate and end positions in the second ribbon set printing completion state, as described above. FIG. 15A shows a calendar sheet 801 on which the resultant image and date areas are integrated, a date area 802 of the next month, and an paper end hole 804, similar to FIG. 11A.

Figure 15B:
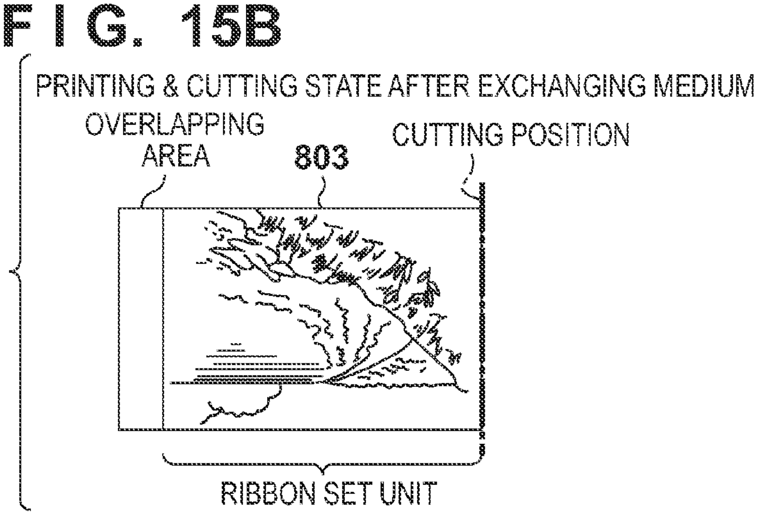
Figure 15C:
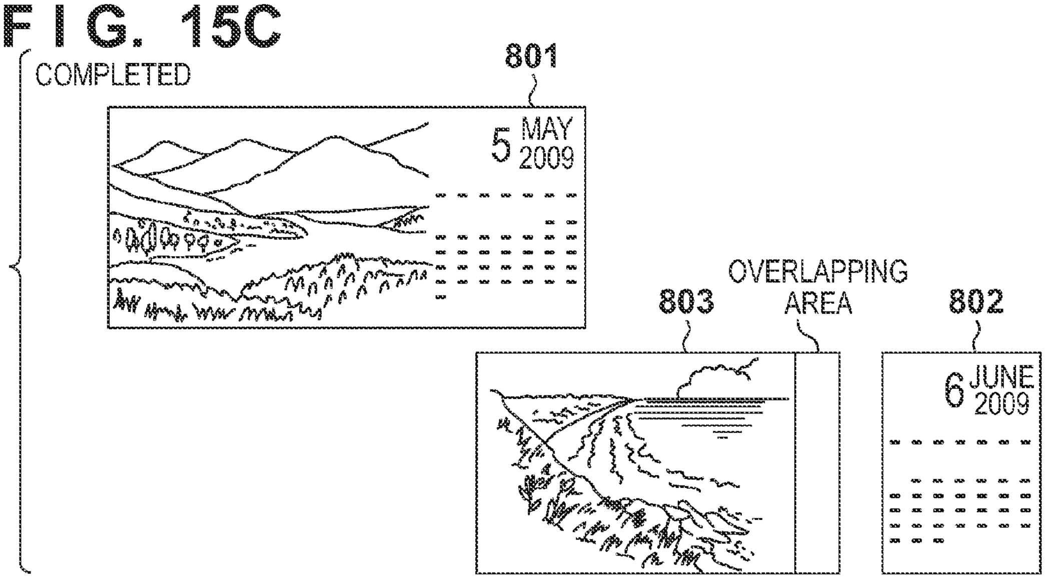
Figure 16A:
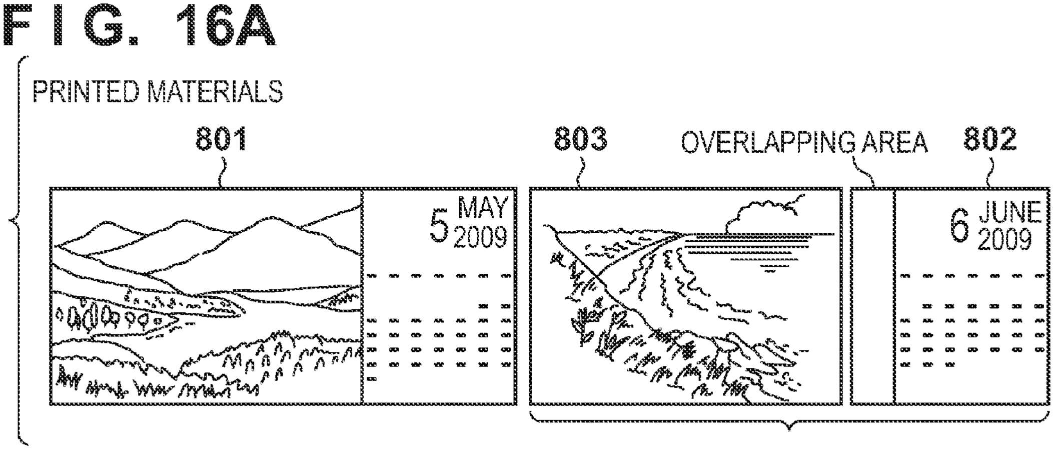
FIGS. 16A to 16C are views for explaining a use example of completed printed materials when the paper or ink ribbon is insufficient for one ribbon set.
Figure 16B:
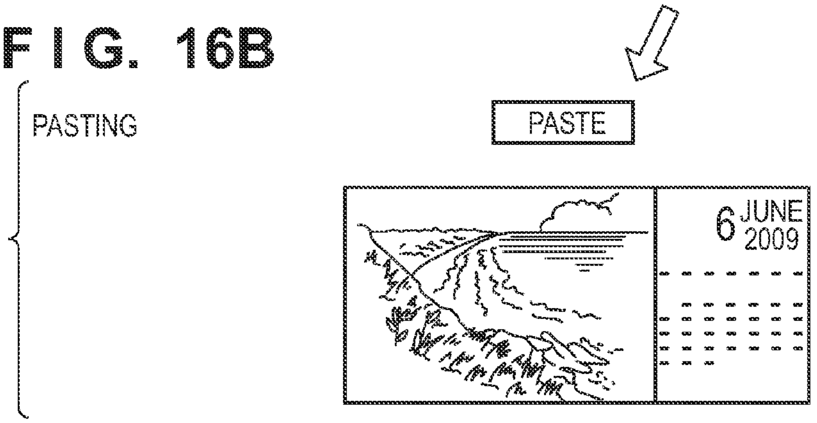
Figure 16C:
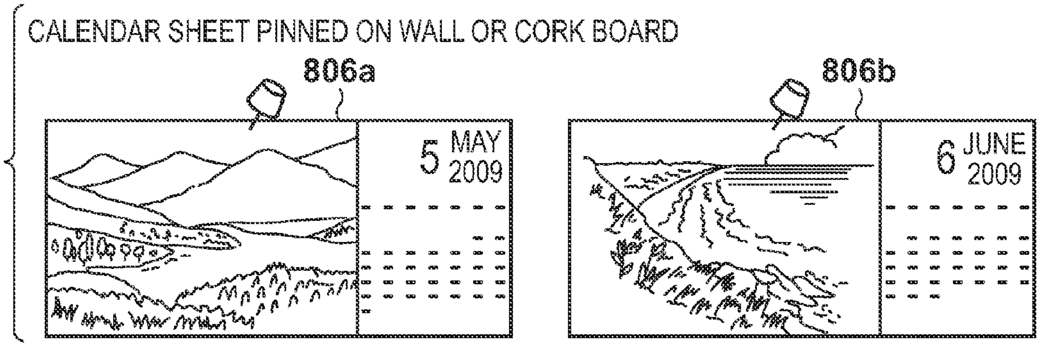

As shown in FIG. 15B, a margin area is formed on the left side of a printed material 803 of only the image area (or its right side when the image is rotated through 180° from the printing completion state to the normal orientation). By using this margin area, the image and date areas are pasted as shown in FIG. 16B. Then, even when the pasted image and date areas are pinned on the wall or a cork board, as shown in FIG. 16C, they can be used similarly to a calendar sheet on which the image and date areas are completed by one sheet, without any practical problem.

A measure when roll paper runs short in the fourth and fifth embodiments is applied to calendar printing in the first embodiment, but can be similarly applied to the second and third embodiments.

(Sixth Embodiment)

In the above embodiments, one calendar sheet is printed with a 1.5-ribbon set unit. However, the present invention is not limited to this.

In addition to calendar printing of image and date areas, the present invention is applicable to, for example, a printing form in which an image area is printed using 1 ribbon set, a text area is printed adjacent to the image area using 0.5 ribbon set, and the image and text areas are output as one printed material. The text area (or date area) need not always be 0.5 times longer than a length printable by one ribbon set. The present invention can be practiced even when the text area (or date area) is less than 0.5 times longer than the length printable by one ribbon set.

When the text area is less than 0.5 times longer than the length printable by one ribbon set, part of the ribbon set for printing the text area is not used. However, printing is possible with three ribbon sets, so the ink ribbon can be saved, compared to separately printing two calendar sheets using four ribbon sets. The boundary between ink ribbon sets does not come to the middle of an image.

In the above-mentioned text area, not only a text but also a graphic or ruled lines may be printed.

(Seventh Embodiment)

A printing form capable of practicing the present invention, in addition to one in the sixth embodiment, will be described with reference to FIGS. 17A to 17D.

Referring to FIGS. 17A to 17D, L is the length of an area printable on paper with one ribbon set in the sub-scanning direction (paper conveyance direction). Hence, one ribbon set can be used to print at the length L or less.

Figure 17A:
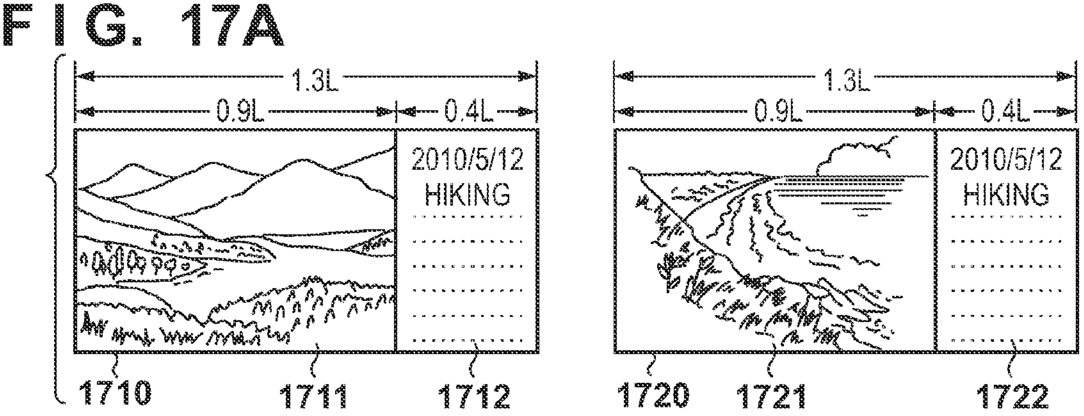
FIGS. 17A to 17D are views for explaining the seventh embodiment.

A case in which printing materials 1710 and 1720 as shown in FIG. 17A are printed will be explained. The printing material 1710 includes an image area 1711 having a length of 0.9 L, and a text area 1712 having a length of 0.4 L. The printing material 1710 has a total length of 1.3 L. Also, the printing material 1720 includes an image area 1721 having a length of 0.9 L, and a text area 1722 having a length of 0.4 L. The printing material 1720 has a total length of 1.3 L. Thus, each of the printing materials 1710 and 1720 is printed using two ribbon sets.

Figure 17B:
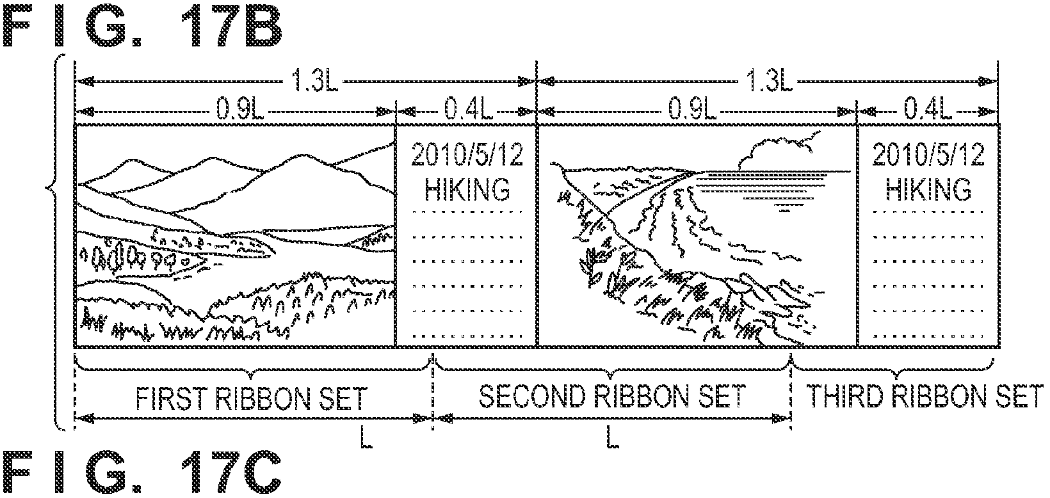
Figure 17C:
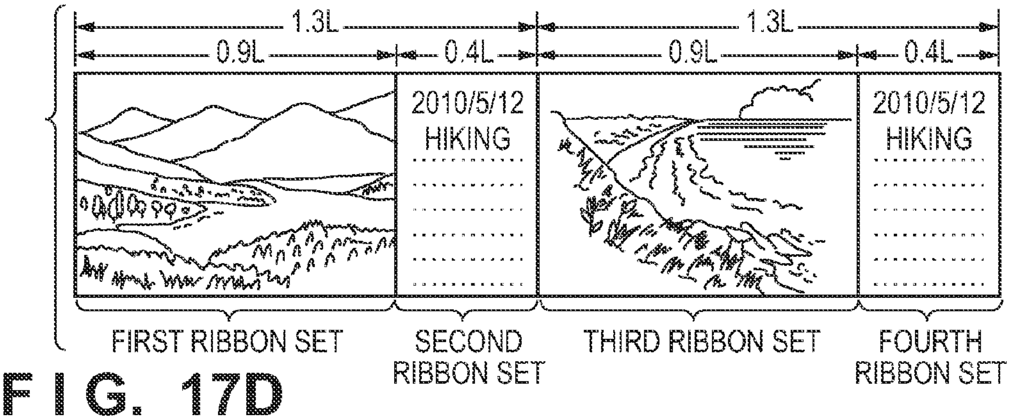
Figure 17D:
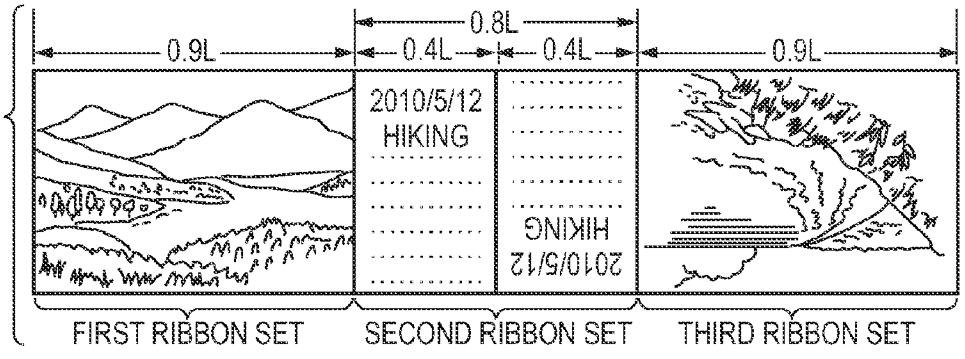

However, the total length of the printing materials 1710 and 1720 is 2.6 L, so the printing materials 1710 and 1720 can be printed successively using only three ink ribbon sets, thereby saving the ink ribbon. When the printing materials 1710 and 1720 are printed adjacent to each other successively, as shown in FIG. 17B, the boundary between ribbon sets is positioned within the image area 1721, degrading the print image quality of the image area at the boundary. To reduce the degradation of the image quality owing to the boundary between ink ribbon sets, printing is done so that the boundary between image and date areas or that between printed materials coincide with the boundary between ink ribbon sets. In this case, however, four ink ribbon sets are used, as shown in FIG. 17C. To prevent this, in the seventh embodiment, one of the printing materials 1710 and 1720 to be successively printed is rotated and printed, as shown in FIG. 17D. In this manner, the image area 1711 (length of 0.9 L) of the printing material 1710 is printed with the first ink ribbon set. The text area 1712 of the printing material 1710 and the text area 1722 of the printing material 1720 (total length of 0.8 L) are printed with the second ink ribbon set. The image area 1721 (length of 0.9 L) of the printing material 1720 is printed with the third ink ribbon set. By this printing, the printing materials 1710 and 1720 can be printed using three ink ribbon sets. Further, the boundary between ink ribbon sets coincides with that between image and text areas, preventing degradation of the image quality caused by the boundary between ink ribbon sets.

In the first to sixth embodiments, the image area has the length L printable with one ink ribbon set. However, even when the image area has a length of less than L, like the seventh embodiment, the present invention is applicable and fully exhibits its effects.

In the embodiment, two printing materials to be successively printed have the same printing form (the same lengths of the image and date areas). However, the present invention is applicable as long as all the following three conditions are satisfied, and the effects of the present invention can be expected.

(1) In a printing form in which the image and date areas are arranged in the sub-scanning direction, the length of a printing material to be printed in this printing form is larger than the length L printable by one ink ribbon set.

(2) The total length of date areas contained in two printing materials to be successively printed is equal to or smaller than L.

(3) The length of an image area contained in each of printing materials to be successively printed is equal to or smaller than L.

More specifically, let L1$i$ be the length of the image area of the first printing material, L1$d$ be that of the date area, L2$i$ be that of the image area of the second printing material, L2$d$ be that of the date area, and L be the length printable by one ink ribbon set. Then, when relations:

$$L1i+L1d>L, L2i+L2d>L$$

$$L1i \leq L, L2i \leq L$$

$$L1d+L2d \leq L$$

are established, the present invention can be practiced to save the ribbon.

When the user can freely set the lengths of the date and image areas, the CPU (not shown) of the printing apparatus 300 may determine whether these relations are established, and only if so, the present invention may be applied.

In the embodiment, print data for one of two successive printing materials is rotated and printed. Alternatively, the date and image areas of one printing material may be interchanged, like the second embodiment.

<Other Embodiments>

Preferred embodiments of the present invention have been described above. However, the present invention is not limited to these embodiments, and can be variously changed and modified without departing from the scope of the invention.

In the above-described embodiments, the present invention is implemented in a printing apparatus. However, the present invention may be implemented to print by a printing apparatus based on print settings designated by the user via a control apparatus in a printing system configured by connecting the control apparatus such as a PC or camera and the printing apparatus. In this case, the control apparatus creates print data in which print data for one of two successive printing materials is rotated, and transmits the print data to the printing apparatus. Further, the control apparatus transmits, to the printing apparatus, information about a position where roll paper is to be cut. The printing apparatus prints based on the print data received from the control apparatus, and cuts roll paper based on the information about the roll paper cutting position. As a result, a desired printing material set by the control apparatus can be printed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-197139, filed Sep. 2, 2010 and No. 2011-173280, filed Aug. 8, 2011, which are hereby incorporated by reference herein in their entirety.

What is claimed is:

1. A printing apparatus comprising:

an ink ribbon on which a plurality of color inks are arranged frame-sequentially;

a printing unit configured to be able to print by a predetermined length by transferring the plurality of color inks onto roll paper by one cycle of said ink ribbon; and a print control unit configured to control the printing apparatus to successively print two calendar sheets in case that the printing apparatus is instructed to print a calendar sheet having a length larger than the predetermined length, wherein the calendar sheet includes an image area corresponding to the predetermined length and a date area having a length not larger than substantially 0.5 times of the predetermined length, and said print control unit controls the printing apparatus to rotate, through 180°, one of the two calendar sheets to be successively printed, and print.

2. The apparatus according to claim 1, wherein in printing of three successive cycles, said print control unit controls the printing apparatus to in printing of a first cycle, print the image area of a first calendar sheet out of the two calendar sheets, in printing of a second cycle, print the date area of the first calendar sheet and print the date area of a second calendar sheet out of the two calendar sheets in an orientation rotated through 180° from the first calendar sheet, and in printing of a third cycle, print the image area of the second calendar sheet in the orientation rotated through 180° from the first calendar sheet.

3. The apparatus according to claim 1, wherein when the lengths of the image area and date area of the two calendar sheets do not have relationships of 1 times and 0.5 times of a unit length, said print control unit controls the printing apparatus to print a first calendar sheet, leave, as an unprinted area, a printable area from an end of the first calendar sheet to a start position of a next cycle, print a second calendar sheet in printing of the next cycle, and leave, as an unprinted area, a printable area from an end of the second calendar sheet to a start position of a next cycle.

4. A printing apparatus comprising:

an ink ribbon on which a plurality of color inks are arranged frame-sequentially;

a printing unit configured to be able to print by a predetermined length by transferring the plurality of color inks onto roll paper by one cycle of said ink ribbon; and a print control unit configured to control the printing apparatus to successively print two calendar sheets in case that the printing apparatus is instructed to print a calendar sheet having a length larger than the predetermined length, wherein the calendar sheet includes an image area corresponding to the predetermined length and a date area having a length not larger than substantially 0.5 times of the predetermined length, and said print control unit controls the printing apparatus to reverse horizontal positions of the image area and date area of one of the two calendar sheets to be successively printed, from horizontal positions of the image area and date area of the other calendar sheet, and print.

5. The apparatus according to claim 4, wherein in printing of three successive cycles, said print control unit controls the printing apparatus to in printing of a first cycle, print the image area of a first calendar sheet out of the two calendar sheets, in printing of a second cycle, print the date area of the first calendar sheet and print the date area of a second calendar sheet out of the two calendar sheets, and in printing of a third cycle, print the image area of the second calendar sheet.

6. The apparatus according to claim 4, further comprising a cutting unit configured to cut the roll paper, wherein said cutting unit cuts the roll paper at an end position of a first calendar sheet upon completion of printing of a second cycle, and cuts the roll paper at an end position of a second calendar sheet upon completion of printing of a third cycle.

7. The apparatus according to claim 6, wherein the printing apparatus further comprises a display unit configured to display a message to prompt a user to exchange one of the roll paper and said ink ribbon, and a first determination unit configured to determine, at a start of printing of a first cycle, whether one of the roll paper and said ink ribbon will run short during printing of the first cycle, when said first determination unit determines that one of the roll paper and said ink ribbon will run short during printing of the first cycle, said display unit displays the message, the printing apparatus further comprises a second determination unit configured to determine, at a start of printing of the second cycle, whether one of the roll paper and said ink ribbon will run short during printing of the second cycle, when said second determination unit determines that one of the roll paper and said ink ribbon will run short during printing of the second cycle, said cutting unit performs first cutting to cut the roll paper at a printing completion position of the first cycle, after the first cutting, said display unit displays the message to prompt the user to exchange one of the roll paper and said ink ribbon, and after printing of the second cycle is executed upon the exchange, said cutting unit further performs second cutting to cut the roll paper at an end position of the first calendar sheet regarding printing of the second cycle, and after printing of the third cycle is executed, performs third cutting to cut the roll paper at an end position of the second calendar sheet regarding printing of the third cycle.

8. The apparatus according to claim 7, wherein when said second determination unit determines that one of the roll paper and said ink ribbon will not run short during printing of the second cycle, said cutting unit performs fourth cutting to cut the roll paper at an end position of the first calendar sheet regarding printing of the second cycle, the printing apparatus further comprises a third determination unit configured to determine, at a start of printing of the third cycle, whether one of the roll paper and said ink ribbon will run short during printing of the third cycle, when said third determination unit determines that one of the roll paper and said ink ribbon will run short during printing of the third cycle, said cutting unit performs fifth cutting to cut the roll paper at a printing completion position of the second cycle, after the fifth cutting, said display unit displays the message, and after printing of the third cycle is executed upon the exchange, said cutting unit further performs sixth cutting to cut the roll paper at a printing completion position of the third cycle.

9. The apparatus according to claim 7, wherein in printing of the second cycle, a margin area is formed to connect a cutting position by the first cutting.

10. The apparatus according to claim 8, wherein in printing of the third cycle, a margin area is formed to connect a cutting position by the third cutting.

11. A method of controlling a printing apparatus including an ink ribbon on which a plurality of color inks are arranged frame-sequentially, and a printing unit configured to be able to print by a predetermined length by transferring the plurality of color inks onto roll paper by one cycle of the ink ribbon, comprising a print control step of controlling the printing unit to successively print two calendar sheets in case that the printing apparatus is instructed to print a calendar sheet having a length larger than the predetermined length, wherein the calendar sheet includes an image area corresponding to the predetermined length and a date area having a length not larger than substantially 0.5 times of the predetermined length, and in the print control step, the printing unit is controlled to rotate, through 180°, one of the two calendar sheets to be successively printed, and print.

12. A method of controlling a printing apparatus including an ink ribbon on which a plurality of color inks are arranged frame-sequentially, and a printing unit configured to be able to print by a predetermined length by transferring the plurality of color inks onto roll paper by one cycle of said ink ribbon, comprising a print control step of controlling the printing unit to successively print two calendar sheets in case that the printing apparatus is instructed to print a calendar sheet having a length larger than the predetermined length, wherein the calendar sheet includes an image area corresponding to the predetermined length and a date area having a length not larger than substantially 0.5 times of the predetermined length, and in the print control step, the printing unit is controlled to reverse horizontal positions of the image area and date area of one of the two calendar sheets to be successively printed, from horizontal positions of the image area and date area of the other calendar sheet, and print.

13. A printing apparatus comprising:

an ink ribbon on which a plurality of color inks are arranged frame-sequentially;

a printing unit configured to be able to print by a predetermined length by transferring the plurality of color inks onto roll paper by one cycle of said ink ribbon; and a print control unit configured to, in case that the printing apparatus is instructed to print in a predetermined printing form having a length larger than the predetermined length, control the printing apparatus to successively print two printing materials in the predetermined printing form, wherein the predetermined printing form includes an image area corresponding to the predetermined length and a text area having a length not larger than substantially 0.5 times of the predetermined length, and said print control unit controls the printing apparatus to rotate, through 180°, one of the two printing materials to be successively printed in the predetermined printing form, and print.

14. A printing apparatus comprising:

an ink ribbon on which a plurality of color inks are arranged frame-sequentially;

a printing unit configured to be able to print by a predetermined length by transferring the plurality of color inks onto roll paper by one cycle of said ink ribbon; and a print control unit configured to, in case that the printing apparatus is instructed to print in a predetermined printing form having a length larger than the predetermined length, control the printing apparatus to successively print two printing materials in the predetermined printing form, wherein the predetermined printing form includes an image area corresponding to the predetermined length and a text area having a length not larger than substantially 0.5 times of the predetermined length, and said print control unit controls the printing apparatus to reverse horizontal positions of the image area and text area of one of the two printing materials to be successively printed in the predetermined printing form, from horizontal positions of the image area and text area of the other printing material, and print.

15. A printing apparatus comprising:

an ink ribbon on which a plurality of color inks are arranged frame-sequentially;

a printing unit configured to be able to print by a predetermined length by transferring the plurality of color inks onto roll paper by one cycle of said ink ribbon; and a print control unit configured to, in case that the printing apparatus is instructed to print in a predetermined printing form having a length larger than the predetermined length, control the printing apparatus to print in the predetermined printing form, the predetermined printing form including an image area having a length not larger than the predetermined length and a text area having a length not larger than the predetermined length, wherein when a sum of lengths of text areas of two printing materials to be successively printed in the predetermined printing form is not larger than the predetermined length in successively printing the two printing materials in the predetermined printing form, said print control unit controls the printing apparatus to rotate, through 180°, one of the two printing materials to be successively printed in the predetermined printing form, and print.

16. A printing apparatus comprising:

an ink ribbon on which a plurality of color inks are arranged frame-sequentially;

a printing unit configured to be able to print by a predetermined length by transferring the plurality of color inks onto roll paper by one cycle of said ink ribbon; and a print control unit configured to, in case that the printing apparatus is instructed to print in a predetermined printing form having a length larger than the predetermined length, control the printing apparatus to print in the predetermined printing form, the predetermined printing form including an image area corresponding to not larger than the predetermined length and a text area having a length not larger than the predetermined length, wherein when a sum of lengths of text areas of two printing materials to be successively printed in the predetermined printing form is not larger than the predetermined length in successively printing the two printing materials are in the predetermined printing form, said print control unit controls the printing apparatus to reverse horizontal positions of the image area and text area of one of the two printing materials to be successively printed in the predetermined printing form, from horizontal positions of the image area and text area of the other printing material, and print.

17. A method of controlling a printing apparatus including an ink ribbon on which a plurality of color inks are arranged frame-sequentially, and a printing unit configured to be able to print by a predetermined length by transferring the plurality of color inks onto roll paper by one cycle of the ink ribbon, comprising a print control step of, in case that the printing apparatus is instructed to print in a predetermined printing form having a length larger than the predetermined length, controlling the printing unit to successively print two printing materials in the predetermined printing form, wherein the predetermined printing form includes an image area corresponding to the predetermined length and a text area having a length not larger than substantially 0.5 times of the predetermined length, and in the print control step, the printing unit is controlled to rotate, through 180°, one of the two printing materials to be successively printed in the predetermined printing form, and print.

18. A method of controlling a printing apparatus including an ink ribbon on which a plurality of color inks are arranged frame-sequentially, and a printing unit configured to be able to print by a predetermined length by transferring the plurality of color inks onto roll paper by one cycle of the ink ribbon, comprising a print control step of, in case that the printing apparatus is instructed to print in a predetermined printing form having a length larger than the predetermined length, controlling the printing unit to successively print two printing materials in the predetermined printing form, wherein the predetermined printing form includes an image area corresponding to the predetermined length and a text area having a length not larger than substantially 0.5 times of the predetermined length, and in the print control step, the printing unit is controlled to reverse horizontal positions of the image area and text area of one of the two printing materials to be successively printed in the predetermined printing form, from horizontal positions of the image area and text area of the other printing material, and print.

19. A method of controlling a printing apparatus including an ink ribbon on which a plurality of color inks are arranged frame-sequentially, and a printing unit configured to be able to print by a predetermined length by transferring the plurality of color inks onto roll paper by one cycle of the ink ribbon, comprising a print control step of, in case that the printing apparatus is instructed to print in a predetermined printing form having a length larger than the predetermined length, controlling the printing unit to print in the predetermined printing form, wherein the predetermined printing form includes an image area having a length not larger than the predetermined length and a text area having a length not larger than the predetermined length, and when a sum of lengths of text areas of two printing materials to be successively printed in the predetermined printing form is not larger than the predetermined length in successively printing the two printing materials in the predetermined printing form, the printing unit is controlled in the print control step to rotate, through 180°, one of the two printing materials to be successively printed in the predetermined printing form, and print.

20. A method of controlling a printing apparatus including an ink ribbon on which a plurality of color inks are arranged frame-sequentially, and a printing unit configured to be able to print by a predetermined length by transferring the plurality of color inks onto roll paper by one cycle of the ink ribbon, comprising a print control step of, in case that the printing apparatus is instructed to print in a predetermined printing form having a length larger than the predetermined length, controlling the printing unit to print in the predetermined printing form, wherein the predetermined printing form includes an image area having a length not larger than the predetermined length and a text area having a length not larger than the predetermined length, and when a sum of lengths of text areas of the two printing materials to be successively printed in the predetermined printing form is not larger than the predetermined length in successively printing the two printing materials in the predetermined printing form, the printing unit is controlled in the print control step to reverse horizontal positions of the image area and text area of one of the two printing materials to be successively printed in the predetermined printing form, from horizontal positions of the image area and text area of the other printing material, and print.

* * * * *